(12) United States Patent
Takita et al.

(10) Patent No.: US 8,748,028 B2
(45) Date of Patent: Jun. 10, 2014

(54) MULTI-LAYER MICROPOROUS MEMBRANE, BATTERY SEPARATOR AND BATTERY

(75) Inventors: Kotaro Takita, Nasusiobara (JP); Shintaro Kikuchi, Saitama (JP)

(73) Assignee: Toray Battery Separator Film Co. Ltd. (JP)

( * ) Notice: Subject to any disclaimer, the term of this patent is extended or adjusted under 35 U.S.C. 154(b) by 1414 days.

(21) Appl. No.: 11/934,491

(22) Filed: Nov. 2, 2007

(65) Prior Publication Data

US 2009/0117454 A1 May 7, 2009

(51) Int. Cl.
*H01M 2/18* (2006.01)

(52) U.S. Cl.
USPC ............................................. 429/145

(58) Field of Classification Search
USPC ................... 429/145; 428/315.5; 156/77
See application file for complete search history.

(56) References Cited

U.S. PATENT DOCUMENTS

| 2007/0221568 | A1 | 9/2007 | Nagashiki et al. | |
| 2008/0057388 | A1 | 3/2008 | Kono et al. | |
| 2009/0274955 | A1* | 11/2009 | Kikuchi et al. | 429/144 |

FOREIGN PATENT DOCUMENTS

| EP | 1 900 514 | | 3/2008 |
| JP | 6122142 | | 5/1994 |
| JP | 7-216118 | | 8/1995 |
| JP | 10-195215 | | 7/1998 |
| JP | 10-279718 | | 10/1998 |
| WO | WO 2007/010878 | * | 1/2007 |
| WO | WO 2008/016174 | | 2/2008 |
| WO | WO 2008/026780 | | 3/2008 |

* cited by examiner

*Primary Examiner* — Larry Thrower
(74) *Attorney, Agent, or Firm* — DLA Piper LLP (US)

(57) ABSTRACT

The invention relates to a particular multi-layer microporous membrane having a good balance of important properties, including excellent electrochemical stability and low heat shrinkage, while maintaining high permeability and heat resistance, with good mechanical strength, compression resistance and electrolytic solution absorption. Of particular importance when used as a battery separator, the present multi-layer microporous membrane exhibits excellent heat shrinkage, melt down temperature and thermal mechanical properties, i.e. low maximum shrinkage in the molten state. The multi-layer microporous membrane of the present invention is manufactured by layering, such as for example by coextrusion, one or more microporous membrane first layers and one or more microporous membrane second layers, such as on one or both sides of a first layer. The invention further relates to battery separators comprising the multi-layer microporous membrane and batteries utilizing the battery separators.

6 Claims, No Drawings

MULTI-LAYER MICROPOROUS MEMBRANE, BATTERY SEPARATOR AND BATTERY

FIELD OF THE INVENTION

The present invention relates to a multi-layer microporous membrane having a good balance of important properties, including excellent electrochemical stability and low heat shrinkage, as well as high permeability and heat resistance, when used as a battery separator. This multi-layer microporous membrane also has good mechanical strength, electrolytic solution absorption and compression resistance properties. The invention also relates to a method for producing such a multi-layer microporous membrane, to battery separators comprising such a multi-layer microporous membrane, and to batteries utilizing such battery separators.

BACKGROUND OF THE INVENTION

Microporous polyolefin membranes can be used as battery separators in, for example, primary and secondary lithium batteries, lithium polymer batteries, nickel-hydrogen batteries, nickel-cadmium batteries, nickel-zinc batteries, silver-zinc secondary batteries, etc. When microporous polyolefin membranes are used for battery separators, particularly lithium ion battery separators, the membranes' performance significantly affects the properties, productivity and safety of the batteries. Accordingly, the microporous polyolefin membrane should have suitable mechanical properties, heat resistance, permeability, dimensional stability, shut down properties, melt down properties, etc. As is known, it is desirable for the batteries to have a relatively low shut down temperature and a relatively high melt down temperature for improved battery safety properties, particularly for batteries that are exposed to high temperatures during manufacturing, charging, re-charging, use, and/or storage. Improving separator permeability generally leads to an improvement in the battery's storage capacity. High shut down speed is desired for improved battery safety, particularly when the battery is operated under overcharge conditions. Improving pin puncture strength is desired because roughness of the battery's electrode can puncture the separator during manufacturing leading to a short circuit. Improved thickness uniformity is desired because thickness variations lead to manufacturing difficulties when winding the film on a core. Thickness variations can also lead to non-isotropic temperature variations in the battery, which can lead to battery hot-spots (regions of higher temperature) where the separator is relatively thin.

In general, microporous membranes containing only polyethylene (i.e., the membrane consists of, or consists essentially of, polyethylene) have low melt down temperatures, while microporous membranes containing only polypropylene have high shut down temperatures. Accordingly, microporous membranes comprising polyethylene and polypropylene as main components have been proposed as improved battery separators. It is therefore desired to provide microporous membranes formed from polyethylene resins and polypropylene resins, and multi-layer microporous membranes comprising polyethylene and polypropylene.

JP7-216118A, for example, discloses a battery separator having a suitable shut down temperature and mechanical strength. The patent publication discloses a battery separator comprising a multi-layer porous film having two microporous layers. Both layers can contain polyethylene and polypropylene, but in different relative amounts. For example, the percentage of the polyethylene is 0 to 20 wt. % in the first microporous layer, and 21 to 60 wt. % in the second microporous layer, based on the combined weight of the polyethylene and polypropylene. The total amount of polyethylene in both microporous layers is 2 to 40 wt. %, based on the weight of the multi-layer microporous membrane.

JP10-195215A discloses a relatively thin battery separator having acceptable shut down and pin-pulling characteristics. The term "pin pulling" refers to the relative ease of pulling a metal pin from a laminate of a separator, a cathode sheet and an anode sheet, which is wound around the pin, to form a toroidal laminate. The multi-layer porous film contains polyethylene and polypropylene, but in different relative amounts. The percentage of polyethylene is 0 to 20 wt. % in the inner layer and 61 to 100 wt. % in the outer layer, based on the total weight of the polyethylene and polypropylene.

JP10-279718A discloses a separator designed to prevent unacceptably large temperature increases in a lithium battery when the battery is overcharged. The separator is formed from a multi-layer porous film made of polyethylene and polypropylene, with different relative amounts of polyethylene and polypropylene in each layer. The film has a polyethylene-poor layer whose polyethylene content is 0 to 20 wt. %, based on the weight of the polyethylene-poor layer. The second layer is a polyethylene-rich layer which contains 0.5 wt. % or more of polyethylene having a melt index of 3 or more and a total polyethylene content of 61 to 100 wt. %, based on the weight of the polyethylene-rich layer.

It is desirable to further improve the permeability, pin puncture strength, and shutdown speed of microporous polyolefin membranes. Moreover, it is desirable to further improve the thickness uniformity of microporous polyolefin membranes in order to reduce the likelihood of short-circuiting when used as battery separators. Particularly, it is desirable to provide a microporous membrane having excellent electrochemical stability and low heat shrinkage, as well as high permeability and heat resistance, when used as a battery separator.

SUMMARY OF THE INVENTION

The present invention relates to the discovery of a particular multi-layer microporous membrane having a good balance of important properties, including excellent electrochemical stability and low heat shrinkage, while maintaining high permeability and heat resistance, with good mechanical strength, compression resistance and electrolytic solution absorption. Of particular importance when used as a battery separator, the present multi-layer microporous membrane exhibits excellent heat shrinkage, melt down temperature and thermal mechanical properties, i.e. low maximum shrinkage in the molten state. The multi-layer microporous membrane of the present invention is manufactured by layering, such as for example by coextrusion, one or more microporous membrane first layers and one or more microporous membrane second layers, such as on one or both sides of a first layer. The first layer generally comprises or consists of or consists essentially of a first layer material. The second layer generally comprises or consists of or consists essentially of a second layer material. Accordingly, in an embodiment, the invention relates to a multi-layer microporous membrane having suitably well-balanced permeability, pin puncture strength, shut down temperature, shut down speed, melt down temperature, and thickness uniformity, along with enhanced electrochemical stability and low heat shrinkage. In another embodiment, the invention relates to a method for making the multi-layer microporous membrane. "Well-balanced" in this context means that a particular property of the membrane (e.g., permeability) is not degraded to an undesirable value in order to improve another membrane property (e.g., electrochemical stability and low heat shrinkage).

In another embodiment, the invention relates to a battery separator formed by such a multi-layer microporous membrane. In another embodiment, the invention relates to a battery comprising such a separator formed by such a multi-layer microporous membrane.

The present invention relates to a polyolefin membrane comprising a first layer and a second layer. The first layer comprises a first layer material which can be produced from a first polyolefin solution. The second layer comprises a second layer material which can be produced from a second polyolefin solution. The multi-layer microporous membrane comprises at least these two layers and can optionally comprise additional layers. For example, the multilayer microporous membrane can comprise a third layer in planar contact with the second layer which in turn is in planar contact with the first layer. In other words, the second layer can be a middle layer between the first and third layers. In this embodiment, the first and third layers generally comprise the first layer material and the second layer generally comprises the second layer material. In yet another embodiment, the multi-layer microporous membrane is a three-layer membrane where the first layer (comprising the first layer material) is the middle layer with the second and third layers comprising outer (or skin) layers of the membrane. In this embodiment, the second and third layers can both comprise the second layer material. In other embodiments, the membrane contains one or more layers comprising the first layer material and one or more layers comprising the second layer material, such as for example a layer comprising the first layer material layers on one or both sides of a layer comprising the second layer material, wherein the first layer material comprises polyethylene and polypropylene and the second material layer comprises polyethylene. In an embodiment, the membrane contains at least one layer comprising a first layer material and a second layer comprising a second layer material wherein (i) the first layer material comprises from about 30 to about 70%, for example from about 40 to about 60%, of a first polyethylene; from about 20 to about 40%, for example from about 25 to about 40% of a first polypropylene; and from about 10 to about 30%, for example from about 10 to about 25% of a second polypropylene, percentages based on the weight of the first material layer;

(ii) the second layer material comprises from about 60 to about 90%, for example from about 70 to about 85%, of the first polyethylene; and from about 10 to about 40%, for example from about 15 to about 30%, of a second polyethylene, percentages based on the weight of the second material layer; and (iii) the total first to total second layer thickness ratio is from about 10/90 to about 75/25, for example from about 20/80 to about 50/50.

In an embodiment, the first layer material comprises (a) from about 30 to about 70%, for example from about 40 to about 60%, of a first polyethylene having a weight average molecular weight of from about $2.5 \times 10^5$ to about $5 \times 10^5$ and a molecular weight distribution of from about 5 to about 100, (b) from about 20 to about 40%, for example from about 25 to about 40%, of a first polypropylene having a weight average molecular weight of from about $0.8 \times 10^6$ to about $1.5 \times 10^6$, a molecular weight distribution of from about 1 to about 100 and a heat of fusion of 80 J/g or higher, and (c) from about 10 to about 30%, for example from about 10 to about 25%, of a second polypropylene having a weight average molecular weight of from about $4 \times 10^5$ to about $7.5 \times 10^5$, a molecular weight distribution of from about 5 to about 100 and a heat of fusion of 80 J/g or higher, percentages based on the weight of the first layer material; and the second layer material comprises (a) from about 60 to about 90%, for example from about 70 to about 85%, of the first polyethylene having a weight average molecular weight of from about $2.5 \times 10^5$ to about $5 \times 10^5$ and a molecular weight distribution of from about 5 to about 100, and (a') from about 10 to about 40%, for example from about 15 to about 30%, of a second polyethylene having a weight average molecular weight of from about $1 \times 10^6$ to about $5 \times 10^6$ and a molecular weight distribution of from about 5 to about 100, percentages based on the weight of the second layer material.

In a further embodiment of the present invention, the multi-layer microporous membrane of the present invention can be produced by steps comprising layering, such as for example by coextrusion, one or more layers comprising a first layer material with one or more layers comprising a second layer material, the layers containing the first layer material can be on one or both sides of the layers containing the second layer material. The first layer material can be produced by (1) combining a first polyolefin composition and at least one diluent or solvent, for example a membrane-forming solvent, to form a first polyolefin solution, the first polyolefin composition comprising (a) from about 30 to about 70%, for example from about 40 to about 60%, of a first polyethylene resin having a weight average molecular weight of from about $2.5 \times 10^5$ to about $5 \times 10^5$ and a molecular weight distribution of from about 5 to about 100, (b) from about 20 to about 40%, for example from about 25 to about 40%, of a first polypropylene resin having a weight average molecular weight of from about $0.8 \times 10^6$ to about $1.5 \times 10^6$, a molecular weight distribution of from about 1 to about 100 and a heat of fusion of 80 J/g or higher, and (c) from about 10 to about 30%, for example from about 10 to about 25%, of a second polypropylene resin having a weight average molecular weight of from about $4 \times 10^5$ to about $7.5 \times 10^5$, a molecular weight distribution of from about 5 to about 100 and a heat of fusion of 80 J/g or higher, percentages based on the weight of the first polyolefin composition, (2) extruding the first polyolefin solution through a die to form an extrudate, (3) cooling the extrudate to form a cooled extrudate having a high polyolefin content, (4) stretching the cooled extrudate in at least one direction at a high stretching temperature to form a stretched sheet, (5) removing at least a portion of the diluent or solvent from the stretched sheet to form a membrane, (6) stretching the membrane to a high magnification in at least one direction to form a stretched membrane, and (7) heat-setting the membrane product of step (6) to form a microporous layer comprising the first layer material layer. The second layer material can be produced by steps comprising (1) combining a second polyolefin composition and at least one diluent or solvent, for example a membrane-forming solvent, to form a second polyolefin solution, the second polyolefin composition comprising (a) from about 60 to about 90%, for example from about 70 to about 85%, of the first polyethylene resin having a weight average molecular weight of from about $2.5 \times 10^5$ to about $5 \times 10^5$ and a molecular weight distribution of from about 5 to about 100, and (a') from about 10 to about 40%, for example from about 15 to about 30%, of a second polyethylene resin having a weight average molecular weight of from about $1 \times 10^6$ to about $5 \times 10^6$ and a molecular weight distribution of from about 5 to about 100, percentages based on the weight of the second polyolefin composition, (2) extruding the second polyolefin solution through a die to form an extrudate, (3) cooling the extrudate to form a cooled extrudate having a high polyolefin content, (4) stretching the cooled extrudate in at least one direction at a high stretching temperature to form a stretched sheet, (5) removing at least a portion of the diluent or solvent from the stretched sheet to form a membrane, (6) stretching the membrane to a high magnification in at least one direction to form a stretched membrane, and (7) heat-setting the membrane product of step (6) to form a second microporous layer comprising the second layer material. The first and second layers may be layered with each other downstream of the above step (7), or may be layered with each other at any of steps (3) through (7), or may be coextruded, i.e. extruded simultaneously through separate dies, at step (2). Identifying layers comprising the first microporous layer material as "a" and layers comprising the second microporous layer material as "b", the multilayer membrane can have the form of, e.g., a/b, a/b/a, b/a/b, a/b/a/b, b/a/b/a/b, a/b/a/b/a, etc. The layer thickness ratio of the total of the layers comprising the first layer material to the total of the layers comprising the second layer material can be, e.g., from about 10/90 to about 75/25, for example from about 20/80 to about 50/50.

When the layers comprising the first layer material are layered with layers comprising the second layer material, e.g., by coextrusion, the multi-layer microporous membrane of the present invention is produced by steps of (1a) combining a first polyolefin composition and at least one diluent or solvent, for example a membrane-forming solvent, to form a first polyolefin solution, the first polyolefin composition comprising (a) from about 30 to about 70%, for example from about 40 to about 60%, of a first polyethylene resin having a weight average molecular weight of from about $2.5 \times 10^5$ to about $5 \times 10^5$ and a molecular weight distribution of from about 5 to about 100, (b) from about 20 to about 40%, for example from about 25 to about 40%, of a first polypropylene resin having a weight average molecular weight of from about $0.8 \times 10^6$ to about $1.5 \times 10^6$, a molecular weight distribution of from about 1 to about 100 and a heat of fusion of 80 J/g or higher, and (c) from about 10 to about 30%, for example from about 10 to about 25%, of a second polypropylene resin having a weight average molecular weight of from about $4 \times 10^5$ to about $7.5 \times 10^5$, a molecular weight distribution of from about 5 to about 100 and a heat of fusion of 80 J/g or higher, percentages based on the weight of the first polyolefin composition, (1b) combining a second polyolefin composition and at least one diluent or solvent, for example a membrane-forming solvent, to form a second polyolefin solution, the second polyolefin composition comprising (a) from about 60 to about 90%, for example from about 70 to about 85%, of the first polyethylene resin having a weight average molecular weight of from about $2.5 \times 10^5$ to about $5 \times 10^5$ and a molecular weight distribution of from about 5 to about 100, and (a') from about 10 to about 40%, for example from about 15 to about 30%, of a second polyethylene resin having a weight average molecular weight of from about $1 \times 10^6$ to about $5 \times 10^6$ and a molecular weight distribution of from about 5 to about 100, percentages based on the weight of the second polyolefin composition, (2) simultaneously extruding the first and second polyolefin solutions through dies to form first and second extrudates such that they are in planar contact one with the other, (3) simultaneously cooling the first and second extrudates to form cooled extrudates having high polyolefin contents, (4) simultaneously stretching the cooled extrudates in at least one direction at a high stretching temperature to form a stretched sheet comprising a first layer material and a second layer material, (5) removing at least a portion of the diluent or solvent from the stretched sheet to form a membrane comprising a first layer comprising the first layer material and a second layer comprising the second layer material, (6) stretching the membrane to a high magnification in at least one direction to form a stretched membrane comprising a first layer material and a second layer material, and (7) heat-setting the stretched membrane product of step (6) to form the coextruded microporous membrane comprising a first microporous layer and a second microporous layer.

Of course, coextrusion may comprise more than one layer comprising the first layer material and more that one layer comprising the second layer material by way of extruding any number of polyolefin solutions comprising respective polyolefin compositions such that step (2) of the method of the invention results in simultaneously extruding the various polyolefin solutions through dies to form respective extrudates such that they are in planar contact one with the other. For example, the extrudates in planar contact one with the other may comprise a first layer and a second layer; a first layer, a second layer, and a first layer; a first layer, a second layer, a first layer, and a second layer; etc.

The present invention also relates to a battery separator formed by the multi-layer microporous membrane recited in any one of the preceding embodiments.

The invention also relates to a battery comprising a separator formed by the multi-layer microporous membrane recited in any of the preceding embodiments.

In related embodiments, the multi-layer microporous membrane of the present invention can be characterized by the following independently-selected features, either alone or in combination:

(1) The first polyethylene has an Mw of from about $2.5 \times 10^5$ to about $4 \times 10^5$, e.g. about $3 \times 10^5$, and an Mw/Mn of from about 5 to about 50.

(2) The second polyethylene has an Mw of from about $1 \times 10^6$ to about $4 \times 10^6$, e.g. about $2 \times 10^6$, and an Mw/Mn of from about 5 to about 50.

(3) The first polyethylene is selected from one or more of a high density polyethylene, a medium density polyethylene, a branched low density polyethylene, or a linear low density polyethylene.

(4) The first polyethylene is at least one of (i) an ethylene homopolymer or (ii) a copolymer of ethylene and a third α-olefin selected from the group consisting of propylene, butene-1, pentene-1, hexene-1, 4-methylpentene-1, octene-1, vinyl acetate, methyl methacrylate, styrene, butadiene, 1,5-hexadiene, 1,7-octadiene and 1,9-decadiene.

(5) The second polyethylene is an ultra-high molecular weight polyethylene.

(6) The second polyethylene is at least one of (i) an ethylene homopolymer or (ii) a copolymer of ethylene and a third α-olefin selected from the group consisting of propylene, butene-1, pentene-1, hexene-1, 4-methylpentene-1, octene-1, vinyl acetate, methyl methacrylate, styrene, butadiene, 1,5-hexadiene, 1,7-octadiene and 1,9-decadiene.

(7) The first and second polypropylene are at least one or more of (i) a propylene homopolymer or (ii) a copolymer of propylene and a fourth olefin selected from one or more of α-olefins such as ethylene, butene-1, pentene-1, hexene-1, 4-methylpentene-1, octene-1, vinyl acetate, methyl methacrylate, styrene, butadiene, 1,5-hexadiene, 1,7-octadiene and 1,9-decadiene.

(8) The first polypropylene has an Mw of from about $0.9 \times 10^6$ to about $1.4 \times 10^6$, e.g. about $1.1 \times 10^6$, an Mw/Mn of from about 1 to about 50, and a heat of fusion of from about 80 to about 120 J/g.

(9) The second polypropylene has an Mw of from about $5 \times 10^5$ to about $7 \times 10^5$, e.g. about $6.6 \times 10^5$, an Mw/Mn of from about 5 to about 50, and a heat of fusion of from about 80 to about 120 J/g.

(10) The multi-layer microporous membrane of the present invention constitutes two layers, a skin layer composed of the first layer material and a core layer composed of the second layer material, such that the layer thickness ratio of the first layer to the second layer is from about 10/90 to about 75/25.

(11) The multi-layer microporous membrane of the present invention constitutes three layers, a skin layer composed of the first layer material on both surface sides of a core layer composed of the second layer material, such that the layer thickness ratio of the first layers to the second layer is from about 10/90 to about 75/25.

(12) The multi-layer microporous membrane exhibits a porosity of from about 25% to about 80%.

(13) The multi-layer microporous membrane exhibits an air permeability of from about 20 seconds/100 cm$^3$ to about 400 seconds/100 cm$^3$ (referenced to an air permeability value for a microporous polyolefin membrane having a 20 μm thickness).

(14) The multi-layer microporous membrane exhibits a pin puncture strength of at least about 2,000 mN/20 μm.

(15) The multi-layer microporous membrane exhibits a tensile strength of at least about 49,000 kPa.

(16) The multi-layer microporous membrane exhibits a tensile elongation of at least about 100%.

(17) The multi-layer microporous membrane exhibits a heat shrinkage ratio of about 12% or less in the machine and transverse directions as measured after the microporous membrane has been held at a temperature of about 105° C. for 8 hours.

(18) The multi-layer microporous membrane exhibits a thickness variation ratio that does not exceed about 15%.

(19) The multi-layer microporous membrane exhibits a shut down temperature of about 140° C. or lower.

(20) The multi-layer microporous membrane exhibits a melt down temperature of at least about 150° C.

(21) The multi-layer microporous membrane exhibits a shut down speed that does not exceed about 10 seconds.

(22) The multi-layer microporous membrane exhibits a maximum shrinkage in the molten state (about 140° C.) of less than about 20%.

DETAILED DESCRIPTION OF THE INVENTION

[1] Composition and Structure of the Multi-Layer Microporous Membrane

The present invention relates to a multi-layer microporous membrane having a good balance of important properties, including excellent electrochemical stability and low heat shrinkage, high permeability and heat resistance, good mechanical strength, compression resistance and electrolytic solution absorption, as well as a method for making the membrane. In an embodiment, the multi-layer microporous membrane comprises two layers. The first layer comprises a first microporous layer material, and the second layer comprises a second microporous layer material. For example, the membrane has a planar top layer when viewed from above on an axis approximately perpendicular to the transverse and machine directions of the membrane, with the bottom planar layer hidden from view by the top layer. In another embodiment, the multi-layer microporous membrane comprises three or more layers, wherein the outer layers (also called the "surface" or "skin" layers) are microporous layers comprising the first microporous layer material and at least one intermediate layer comprising the second microporous layer material. Alternatively, the multi-layer microporous membrane comprises three or more layers, wherein the outer layers (also called the "surface" or "skin" layers) are microporous layers comprising the second microporous layer material and at least one intermediate layer comprising the first microporous layer material. In a related embodiment, where the multi-layer microporous membrane comprises two layers, the first layer consists essentially of the first microporous layer material and the second layer consists essentially of the second microporous layer material. In a related embodiment where the multi-layer microporous membrane comprises three or more layers, the outer layers consist essentially of the first microporous layer material and at least one intermediate layer consists essentially of the second microporous layer material.

When the multi-layer microporous membrane has three or more layers, it has at least one layer comprising the first microporous layer material and at least one layer comprising the second microporous layer material.

The first and second microporous layer materials each contain a first polyethylene. The first polyethylene of the first layer material can be independently selected from the first polyethylene of the second layer material. The second layer material contains a greater amount of the first polyethylene than the first layer material, and the total amount of first polyethylene in the multi-layer microporous membrane is at least 37.5 wt. % based on the weight of the multi-layer microporous membrane. The second microporous layer material also contains a second polyethylene.

In an embodiment, the first microporous layer material comprises from about 30 to about 70%, for example from about 40 to about 60 wt. %, of the first polyethylene; from about 20 to about 40%, for example from about 25 to about 40 wt. %, of the first polypropylene; and from about 10 to about 30%, for example from about 10 to about 25 wt. %, of the second polypropylene, percentages based on the weight of the first microporous layer material. The first polyethylene can be, for example, a high density polyethylene ("HDPE"), and the second polyethylene can be, for example, ultra-high molecular weight polyethylene ("UHMWPE").

In an embodiment, the second microporous layer material comprises the first polyethylene and a second polyethylene. The second microporous layer material comprises from about 60 to about 90%, for example from about 70 to about 85 wt. %, of the first polyethylene, and from about 10 to about 40%, for example from about 15 to about 30%, of a second polyethylene, percentages based on the weight of the second microporous layer material. Again, the first polyethylene can be, for example, a high density polyethylene ("HDPE"), and the second polyethylene can be, for example, ultra-high molecular weight polyethylene ("UHMWPE").

A. The First Polyethylene

In an embodiment, the first polyethylene has a weight average molecular weight of from about $2.5 \times 10^5$ to about $5 \times 10^5$, for example from about $2.5 \times 10^5$ to about $4 \times 10^5$, and a molecular weight distribution of from about 5 to about 100, for example from about 5 to about 50. For example, the first polyethylene can be one or more of an HPDE, a medium density polyethylene, a branched low density polyethylene, or a linear low density polyethylene. In an embodiment, the first polyethylene is at least one of (i) an ethylene homopolymer or (ii) a copolymer of ethylene and a third α-olefin such as propylene, butene-1, hexene-1, etc, typically in a relatively small amount compared to the amount of ethylene. The amount of the third olefin can be less than 10% by mole based on 100% by mole of the entire copolymer. Such a copolymer can be produced using a single-site catalyst.

B. The Second Polyethylene

In an embodiment, the second polyethylene has a weight average molecular weight of from about $1\times10^6$ to about $5\times10^6$, for example from about $1\times10^6$ to about $4\times10^6$, e.g. about $2\times10^6$, and a molecular weight distribution of from about 5 to about 100, for example from about 5 to about 50. For example, the second polyethylene can be an UHMWPE. In an embodiment, the second polyethylene is at least one of (i) an ethylene homopolymer or (ii) a copolymer of ethylene and a third α-olefin which is typically present in a relatively small amount compared to the amount of ethylene. The third α-olefin can be, for example, one or more of propylene, butene-1, pentene-1, hexene-1, 4-methylpentene-1, octene-1, vinyl acetate, methyl methacrylate, or styrene. The amount of the third olefin can be less than 10% by mole based on 100% by mole of the entire copolymer.

C. The First Polypropylene

In an embodiment, the first polypropylene has a weight average molecular weight of from about $0.8\times10^6$ to about $1.5\times10^6$, for example from about $0.9\times10^6$ to about $1.4\times10^6$, a molecular weight distribution of from about 1 to about 100, for example from about 1 to about 50, and a heat of fusion of about 80 J/g or higher, for example from about 80 to about 120 J/g. The first polypropylene can be, for example, one or more of (i) a propylene homopolymer or (ii) a copolymer of propylene and a fourth olefin. The copolymer can be a random or block copolymer. The fourth olefin can be, for example, one or more of α-olefins such as ethylene, butene-1, pentene-1, hexene-1, 4-methylpentene-1, octene-1, vinyl acetate, methyl methacrylate, and styrene, etc.; and diolefins such as butadiene, 1,5-hexadiene, 1,7-octadiene, 1,9-decadiene, etc. The amount of the fourth olefin in the copolymer is preferably in a range that does not adversely affect properties of the multi-layer microporous membrane such as heat resistance, compression resistance, heat shrinkage resistance, etc. For example, the amount of the fourth olefin can be less than 10% by mole based on 100% by mole of the entire copolymer. Optionally, the first polypropylene has one or more of the following properties: (i) the polypropylene is isotactic; (ii) the polypropylene has a heat of fusion of at least about 90 J/g, for example from about 90 to about 120 J/g; (iii) the polypropylene has a melting peak (second melt) of at least about 160° C.; (iv) the polypropylene has a Trouton's ratio of at least about 15 when measured at a temperature of about 230° C. and a strain rate of 25 sec$^{-1}$; and/or (v) the polypropylene has an elongational viscosity of at least about 50,000 Pa sec at a temperature of 230° C. and a strain rate of 25 sec$^{-1}$.

D. The Second Polypropylene

In an embodiment, the second polypropylene has a weight average molecular weight of from about $4\times10^5$ to about $7.5\times10^5$, for example from about $5\times10^5$ to about $7\times10^5$, a molecular weight distribution of from about 5 to about 100, for example from about 5 to about 50, and a heat of fusion of about 80 J/g or higher, for example from about 80 to about 120 J/g. The second polypropylene can be, for example, one or more of (i) a propylene homopolymer or (ii) a copolymer of propylene and a fourth olefin. The copolymer can be a random or block copolymer. The fourth olefin can be, for example, one or more of α-olefins such as ethylene, butene-1, pentene-1, hexene-1, 4-methylpentene-1, octene-1, vinyl acetate, methyl methacrylate, and styrene, etc.; and diolefins such as butadiene, 1,5-hexadiene, 1,7-octadiene, 1,9-decadiene, etc. The amount of the fifth olefin in the copolymer is preferably in a range that does not adversely affect properties of the multi-layer microporous membrane such as heat resistance, compression resistance, heat shrinkage resistance, etc. For example, the amount of the fourth olefin can be less than 10% by mole based on 100% by mole of the entire copolymer. Optionally, the second polypropylene has one or more of the following properties: (i) the polypropylene is isotactic; (ii) the polypropylene has a heat of fusion of at least about 90 J/g, for example from about 90 to about 120 J/g; (iii) the polypropylene has a melting peak (second melt) of at least about 160° C.; (iv) the polypropylene has a Trouton's ratio of at least about 15 when measured at a temperature of about 230° C. and a strain rate of 25 sec$^{-1}$; and/or (v) the polypropylene has an elongational viscosity of at least about 50,000 Pa sec at a temperature of 230° C. and a strain rate of 25 sec$^{-1}$.

[2] Materials

A. Polymer Resins Used for the First Polyolefin Composition

The first microporous layer material can be produced from a first polyolefin solution. The first polyolefin solution comprises a first polyolefin composition and a diluent or solvent. Since the process produces a microporous membrane, the diluent or solvent may be referred to as a membrane-forming solvent. The first polyolefin composition comprises a first polyethylene resin, a first polypropylene resin, and a second polypropylene resin. The amount of the first polyethylene resin in the first polyolefin composition is from about 30 to about 70%, for example from about 40 to about 60%, based on the weight of the first polyolefin composition. The amount of the first polypropylene resin in the first polyolefin composition is from about 20 to about 40%, for example from about 25 to about 40%, based on the weight of the first polyolefin composition. The amount of the second polypropylene resin in the first polyolefin composition is from about 10 to about 30%, for example from about 10 to about 25%, based on the weight of the first polyolefin composition.

The first polyethylene resin has a weight average molecular weight of from about $2.5\times10^5$ to about $5\times10^5$ and a molecular weight distribution of from about 5 to about 100. A non-limiting example of the first polyethylene resin for use herein is one that has a weight average molecular weight of from about $2.5\times10^5$ to about $4\times10^5$ and a molecular weight distribution of form about 5 to about 50. The first polyethylene resin can be an ethylene homopolymer, or an ethylene/α-olefin copolymer, such as, for example, one containing a small amount, e.g. about 5 mole %, of a third α-olefin. The third α-olefin, which is not ethylene, is preferably propylene, butene-1, pentene-1, hexene-1, 4-methylpentene-1, octene-1, vinyl acetate, methyl methacrylate, or styrene or combinations thereof. Such copolymer is preferably produced using a single-site catalyst.

Mw/Mn is a measure of molecular weight distribution. The larger this value, the wider the molecular weight distribution. The Mw/Mn of the overall polyethylene composition for use herein is preferably from about 5 to about 100, for example from about 5 to about 50. When the Mw/Mn is less than 5, the percentage of a higher molecular weight component is too high to conduct melt extrusion easily. On the other hand, when the Mw/Mn is more than 100, the percentage of a lower molecular weight component is too high, resulting in decrease in the strength of the resulting microporous membrane. The Mw/Mn of polyethylene (homopolymer or an ethylene/α-olefin copolymer) can be properly controlled by a multi-stage polymerization. The multi-stage polymerization method is preferably a two-stage polymerization method comprising forming a high molecular weight polymer component in the first stage, and forming a low molecular weight polymer component in the second stage. In the polyethylene composition for use herein, the larger the Mw/Mn, the larger difference in Mw exists between higher molecular weight polyethylene and lower molecular weight polyethylene, and vice versa. The Mw/Mn of the polyethylene composition can be properly controlled by the molecular weights and mixing ratios of components.

The first polypropylene resin has a weight average molecular weight of from about $0.8 \times 10^6$ to about $1.5 \times 10^6$, for example from about $0.9 \times 10^6$ to about $1.4 \times 10^6$, a molecular weight distribution of from about 1 to about 100, for example from about 1 to about 50, and a heat of fusion of about 80 J/g or higher, for example from about 80 to about 120 J/g. The first polypropylene resin can be, for example, one or more of (i) a propylene homopolymer or (ii) a copolymer of propylene and a fourth olefin. The copolymer can be a random or block copolymer. The fourth olefin can be, for example, one or more of α-olefins such as ethylene, butene-1, pentene-1, hexene-1, 4-methylpentene-1, octene-1, vinyl acetate, methyl methacrylate, and styrene, etc.; and diolefins such as butadiene, 1,5-hexadiene, 1,7-octadiene, 1,9-decadiene, etc. The amount of the fourth olefin in the copolymer is preferably in a range that does not adversely affect properties of the multi-layer microporous membrane such as heat resistance, compression resistance, heat shrinkage resistance, etc. For example, the amount of the fourth olefin can be less than 10% by mole based on 100% by mole of the entire copolymer.

The second polypropylene resin has a weight average molecular weight of from about $4 \times 10^5$ to about $7.5 \times 10^5$, for example from about $5 \times 10^5$ to about $7 \times 10^5$, a molecular weight distribution of from about 5 to about 100, for example from about 5 to about 50, and a heat of fusion of about 80 J/g or higher, for example from about 80 to about 120 J/g. The second polypropylene resin can be, for example, one or more of (i) a propylene homopolymer or (ii) a copolymer of propylene and a fourth olefin. The copolymer can be a random or block copolymer. The fourth olefin can be, for example, one or more of α-olefins such as ethylene, butene-1, pentene-1, hexene-1, 4-methylpentene-1, octene-1, vinyl acetate, methyl methacrylate, and styrene, etc.; and diolefins such as butadiene, 1,5-hexadiene, 1,7-octadiene, 1,9-decadiene, etc. The amount of the fifth olefin in the copolymer is preferably in a range that does not adversely affect properties of the multi-layer microporous membrane such as heat resistance, compression resistance, heat shrinkage resistance, etc. For example, the amount of the fourth olefin can be less than 10% by mole based on 100% by mole of the entire copolymer.

B. Polymer Resins Used for the Second Polyolefin Composition

The second microporous layer material can be produced from a second polyolefin solution that is selected independently of the first polyolefin solution. The second polyolefin solution comprises a second polyolefin composition and a diluent or solvent which can be the same as the diluent or solvent used in the first polyolefin solution. As is the case in the first polyolefin solution, this diluent or solvent can be referred to as a membrane-forming solvent. The second polyolefin composition comprises the first polyethylene resin and a second polyethylene resin. The amount of the first polyethylene resin in the second polyolefin composition is from about 60 to about 90%, for example from about 70 to about 85%, based on the weight of the second polyolefin composition. The amount of the second polyethylene resin in the second polyolefin composition is from about 10 to about 40 wt. %, for example from about 15 to about 30%, based on the weight of the second polyolefin composition.

The first polyethylene resin for use in the second polyolefin composition is as described above for the first polyolefin composition.

The second polyethylene resin, for example an ultra-high molecular weight polyethylene (UHMWPE) resin, has a weight average molecular weight of from about $1 \times 10^6$ to about $5 \times 10^6$ and a molecular weight distribution of from about 5 to about 100. A non-limiting example of the second polyethylene resin for use herein is one that has a weight average molecular weight of from about $1 \times 10^6$ to about $4 \times 10^6$, for example about $2 \times 10^6$, and a molecular weight distribution of form about 5 to about 50. The second polyethylene resin can be an ethylene homopolymer, or an ethylene/α-olefin copolymer, such as, for example, one containing a small amount, e.g. about 5 mole %, of a third α-olefin. The third α-olefin, which is not ethylene, can be, for example, propylene, butene-1, pentene-1, hexene-1, 4-methylpentene-1, octene-1, vinyl acetate, methyl methacrylate, or styrene or combinations thereof. Such copolymer is preferably produced using a single-site catalyst.

C. Other Components

In addition to the above components, the first and second polyolefin solutions can contain (a) additional polyolefin and/or (b) heat-resistant polymer resins having melting points or glass transition temperatures (Tg) of about 170° C. or higher, in amounts not deteriorating the properties of the microporous membrane, for example 10% or less by mass based on the polyolefin composition.

(a) Additional Polyolefins

The additional polyolefin can be at least one of (a) polybutene-1, polypentene-1, poly-4-methylpentene-1, polyhexene-1, polyoctene-1, polyvinyl acetate, polymethyl methacrylate, polystyrene and an ethylene/α-olefin copolymer, each of which may have an Mw of form $1 \times 10^4$ to $4 \times 10^6$, and (b) a polyethylene wax having an Mw of form $1 \times 10^3$ to $1 \times 10^4$. Polybutene-1, polypentene-1, poly-4-methylpentene-1, polyhexene-1, polyoctene-1, polyvinyl acetate, polymethyl methacrylate and polystyrene are not restricted to homopolymers, but may be copolymers containing still other α-olefins.

(b) Heat-Resistant Resins

The heat-resistant resins can be, for example, (a) amorphous resins having melting points of about 170° C. or higher, which may be partially crystalline, and (b) completely amorphous resins having Tg of about 170° C. or higher and mixtures thereof. The melting point and Tg are determined by differential scanning calorimetry (DSC) according to method JIS K7121. Specific examples of the heat-resistant resins include polyesters such as polybutylene terephthalate (melting point: about 160-230° C.), polyethylene terephthalate (melting point: about 250-270° C.), etc., fluororesins, polyamides (melting point: 215-265° C.), polyarylene sulfide, polyimides (Tg: 280° C. or higher), polyamide imides (Tg: 280° C.), polyether sulfone (Tg: 223° C.), polyetheretherketone (melting point: 334° C.), polycarbonates (melting point: 220-240° C.), cellulose acetate (melting point: 220° C.), cellulose triacetate (melting point: 300° C.), polysulfone (Tg: 190° C.), polyetherimide (melting point: 216° C.), etc.

[3] Manufacturing Method

In an embodiment, the multi-layer microporous membrane of the present invention is a two-layer membrane. In another embodiment, the multi-layer microporous membrane has at least three layers. For the sake of brevity, the production of the microporous membrane will be mainly described in terms of two-layer and three-layer membranes, although those skilled in the art will recognize that the same techniques can be applied for production of membranes of the present invention having at least three layers. Non-limiting examples of such multi-layer membranes would include, looking from top to bottom of the membrane: a first material layer, a second material layer; a first material layer, a second material layer, a first material layer; etc.

In an embodiment, the three-layer microporous membrane comprises a second material layer with a first material layer on each surface of and in planar contact with the second material layer. In an embodiment, the second layer is produced from the second polyolefin solution and the first layers are produced from first polyolefin solutions.

The total amount of the polyethylene in the multi-layer microporous membrane of the present invention should be, and preferably is at least about 47.5 wt. %, based on the weight of the multi-layer microporous membrane. There are a number of options for manufacturing the present multi-layer microporous membrane.

A method for producing the multi-layer microporous membrane of the present invention comprises layering, such as for example by coextrusion, one or more first material layers with one or more second material layers, the first material layers on one or both sides of the second material layers. The first material layer is manufactured by (1) combining a first polyolefin composition and at least one diluent or solvent to form a first polyolefin solution, (2) extruding the first polyolefin solution through a die to form an extrudate, (3) cooling the extrudate to form a cooled extrudate having a high polyolefin content, (4) stretching the cooled extrudate in at least one direction at a high stretching temperature to form a stretched sheet, (5) removing at least a portion of the diluent or solvent from the stretched sheet to form a membrane, (6) stretching the membrane to a high magnification to form a stretched membrane, and (7) heat-setting the stretched membrane product of step (6) to form the first material layer microporous membrane. The second material layer is manufactured by steps comprising (1) combining a second polyolefin composition and at least one diluent or solvent to form a second polyolefin solution, (2) extruding the second polyolefin solution through a die to form an extrudate, (3) cooling the extrudate to form a cooled extrudate having a high polyolefin content, (4) stretching the cooled extrudate in at least one direction at a high stretching temperature to form a stretched sheet, (5) removing at least a portion of the diluent or solvent from the stretched sheet to form a membrane, (6) stretching the membrane to a high magnification to form a stretched membrane, and (7) heat-setting the stretched membrane product of step (6) to form the second material layer microporous membrane. The first and second material layers may be layered with each other downstream of the above step (7), or may be layered with each other at any of steps (3) through (7), or may be coextruded, i.e. extruded simultaneously through separate dies, at step (2). The layer thickness ratio of the total of the layers comprising the first layer material layer to the total of the layers comprising the second layer material can be in the range of from about 10/90 to about 75/25. This ratio can be calculated, e.g., from the amount (by weight) of the first polyolefin solution extruded through the extruder compared to the amount of the second polyolefin solution extruded through the extruder during coextrusion.

When the first and second material layers are layered with each other by coextrusion, the multi-layer microporous membrane of the present invention is manufactured by steps of (1a) combining a first polyolefin composition and at least one diluent or solvent to form a first polyolefin solution, (1b) combining a second polyolefin composition and at least one diluent or solvent to form a second polyolefin solution, (2) simultaneously extruding the first and second polyolefin solutions through dies to form first and second extrudates such that they are in planar contact one with the other, (3) simultaneously cooling the first and second extrudates to form cooled extrudates having high polyolefin contents, (4) simultaneously stretching the cooled extrudates in at least one direction at a high stretching temperature to form a stretched sheet comprising a first layer material and a second layer material, (5) removing at least a portion of the diluent or solvent from the stretched sheet to form a membrane comprising a first layer material and a second layer material, (6) stretching the membrane to a high magnification in at least one direction to form a stretched membrane comprising a first layer material and a second layer material, and (7) heat-setting the stretched membrane product of step (6) to form the coextruded microporous membrane comprising a first layer material and a second layer material.

Of course, coextrusion may comprise more than one first layer material and more that one second layer material by way of extruding any number of polyolefin solutions comprising respective polyolefin compositions such that step (2) of the method of the invention results in simultaneously extruding the various polyolefin solutions through dies to form respective extrudates such that they are in planar contact one with the other. For example, the extrudates in planar contact one with the other may comprise a first layer and a second layer; a first layer, a second layer, and a first layer; a first layer, a second layer, a first layer, and a second layer; etc.

1a. Preparation of First Polyolefin Solution

The first polyolefin composition comprises polyolefin resins as described above that can be combined, for example by dry mixing or melt blending, with an appropriate first diluent or solvent, for example a membrane-forming solvent, to produce the first polyolefin solution. Optionally, the first polyolefin solution can contain various additives such as one or more antioxidants, fine silicate powder (pore-forming material), etc., provided these are used in a concentration range that does not significantly degrade the desired properties of the multi-layer microporous membrane.

The first diluent or solvent is preferably one that is liquid at room temperature. While not wishing to be bound by any theory or model, it is believed that the use of a liquid diluent or solvent to form the first polyolefin solution makes it possible to conduct stretching of the gel-like sheet at a relatively high stretching magnification. In an embodiment, the first diluent or solvent can be at least one of aliphatic, alicyclic or aromatic hydrocarbons such as nonane, decane, decalin, p-xylene, undecane, dodecane, liquid paraffin, etc.; mineral oil distillates having boiling points comparable to those of the above hydrocarbons; and phthalates which are liquid at room temperature such as dibutyl phthalate, dioctyl phthalate, etc. In an embodiment where it is desired to obtain a multi-layer, gel-like sheet having a stable liquid solvent content, non-volatile liquid solvents such as liquid paraffin can be used, either alone or in combination with other solvents. Optionally, a solvent which is miscible with polyethylene in a melt blended state but solid at room temperature can be used, either alone or in combination with a liquid solvent. Such solid solvent can include, for example stearyl alcohol, ceryl alcohol, paraffin waxes, etc. Although it is not critical, it can be more difficult to evenly stretch the gel-like sheet or resulting membrane when the solution contains no liquid solvent.

The viscosity of the liquid solvent is not critical. For example, the viscosity of the liquid solvent can range from about 30 cSt to about 500 cSt, or from about 30 cSt to about 200 cSt, at 25° C. When the viscosity at 25° C. is less than about 30 cSt, it can be more difficult to prevent foaming the polyolefin solution, which can lead to difficulty in blending. On the other hand, when the viscosity is greater than about 500 cSt, it can be more difficult to remove the liquid solvent from the multi-layer microporous polyolefin membrane.

In an embodiment, the resins, etc., used to produce to the first polyolefin composition are melt-blended in, for example, a double screw extruder or mixer. For example, a conventional extruder (or mixer or mixer-extruder) such as a double-screw extruder can be used to combine the resins, etc., to form the first polyolefin composition. The diluent or solvent can be added to the polyolefin composition (or alternatively to the resins used to produce the polyolefin composition) at any convenient point in this step of the process. For example, in an embodiment where the first polyolefin composition and the first diluent or solvent are melt-blended, the diluent or solvent can be added to the polyolefin composition (or its components) at any of (i) before starting melt-blending, (ii) during melt-blending of the first polyolefin composition, or (iii) after melt-blending, for example by supplying the first diluent or solvent to the melt-blended or partially melt-blended polyolefin composition in a second extruder or extruder zone located downstream of the extruder zone used to melt-blend the polyolefin composition.

When melt-blending is used, the melt-blending temperature is not critical. For example, the melt-blending temperature of the first polyolefin solution can range from about 10° C. higher than the melting point $Tm_1$ of the polyethylene resins in the first polyolefin composition to about 120° C. higher than $Tm_1$. For brevity, such a range can be represented as $Tm_1+10°$ C. to $Tm_1+120°$ C. In an embodiment where the polyethylene resins in the first polyolefin composition have a melting point of about 130° C. to about 140° C., the melt-blending temperature can range from about 140° C. to about 250° C., or from about 170° C. to about 240° C.

When an extruder such as a double-screw extruder is used for melt-blending, the screw parameters are not critical. For example, the screw can be characterized by a ratio L/D of the screw length L to the screw diameter D in the double-screw extruder, which can range, for example, from about 20 to about 100, or from about 35 to about 70. Although this parameter is not critical, when L/D is less than about 20, melt-blending can be more difficult, and when L/D is more than about 100, faster extruder speeds might be needed to prevent excessive residence time of the polyolefin solution in the double-screw extruder (which can lead to undesirable molecular weight degradation). The cylinder (or bore) of the double-screw extruder can have an inner diameter of in the range of about 40 mm to about 100 mm, for example.

In an embodiment, the amount of first polyolefin composition in the first polyolefin solution can range from about 1 to about 75 wt. %, based on the weight of the polyolefin solution, for example from about 20 to about 70 wt. %. Although the amount of first polyolefin composition in the first polyolefin solution is not critical, when the amount is less than about 1 wt. %, it can be more difficult to produce the multi-layer microporous polyolefin membrane at an acceptably efficient rate. Moreover, when the amount is less than 1 wt. %, it can be more difficult to prevent swelling or neck-in at the die exit during extrusion, which can make it more difficult to form and support the multi-layer, gel-like sheet, which is a precursor of the membrane formed during the manufacturing process. On the other hand, when the amount of first polyolefin composition solution is greater than about 75 wt. %, it can be more difficult to form the multi-layer, gel-like sheet.

1b. Preparation of Second Polyolefin Solution

The second polyolefin solution can be prepared by the same methods used to prepare the first polyolefin solution. For example, the second polyolefin solution can be prepared by melt-blending a second polyolefin composition with a second diluent or solvent. The second diluent or solvent can be selected from among the same solvents as the first diluent or solvent. While the second diluent or solvent can be selected independently of the first diluent or solvent, the second diluent or solvent can be the same as the first diluent or solvent, and can be used in the same relative concentration as the first diluent or solvent is used in the first polyolefin solution. Optionally, the second polyolefin solution can contain various additives such as one or more antioxidants, fine silicate powder (pore-forming material), etc., provided these are used in a concentration range that does not significantly degrade the desired properties of the multi-layer microporous membrane.

The second polyolefin composition is selected independently of the first polyolefin composition. The second polyolefin composition comprises the first and second polyethylene resins. Since the first and second microporous layer materials do not have the same composition, the resins and the relative amounts of polyethylene resins used to produce the second polyolefin composition are different from the amount of the first polyethylene resin used to produce the first polyolefin composition.

Although it is not critical, the melt-blending conditions for the second polyolefin solution likely differ from the conditions described for producing the first polyolefin composition in that the melt-blending temperature of the second polyolefin solution can range from about the melting point $Tm_2$ of the polyethylene resins in the second polyolefin composition+ 10° C. to $Tm_2+120°$ C.

2. Extrusion

In an embodiment, the first polyolefin solution is conducted from a first extruder to a first die and the second polyolefin solution is conducted from a second extruder to a second die. A layered extrudate in sheet form (i.e., a body significantly larger in the lateral directions than in the thickness direction) can be extruded from the first and second die. Optionally, the first and second polyolefin solutions are co-extruded from the first and second die with a planar surface of a first extrudate layer formed from the first polyolefin solution in contact with a planar surface of a second extrudate layer formed from the second polyolefin solution. A planar surface of the extrudate can be defined by a first vector in the machine direction of the extrudate and a second vector in the transverse direction of the extrudate.

In an embodiment, a die assembly is used where the die assembly comprises the first and second die, as for example when the first die and the second die share a common partition between a region in the die assembly containing the first polyolefin solution and a second region in the die assembly containing the second polyolefin solution.

In another embodiment, a plurality of dies is used, with each die connected to an extruder for conducting either the first or second polyolefin solution to the respective die. For example, in one embodiment, the first extruder containing the first polyolefin solution is connected to a first die and a third die, and a second extruder containing the second polyolefin solution is connected to a second die. As is the case in the preceding embodiment, the resulting layered extrudate can be simultaneously coextruded from the first, second, and third die to form a three-layer extrudate comprising a first and a third layer constituting surface layers (e.g., top and bottom layers) produced from the first polyolefin solution; and a second layer constituting a middle or intermediate layer of the extrudate situated between and in planar contact with both surface layers, where the second layer is produced from the second polyolefin solution.

In yet another embodiment, the same die assembly is used but with the polyolefin solutions reversed, i.e., the second extruder containing the second polyolefin solution is connected to the first die and the third die, and the first extruder containing the first polyolefin solution is connected to the second die.

In any of the preceding embodiments, die extrusion can be conducted using conventional die extrusion equipment. For example, extrusion can be conducted by a flat die or an inflation die. In one embodiment useful for co-extrusion of multi-layer gel-like sheets, multi-manifold extrusion can be used, in which the first and second polyolefin solutions are conducted to separate manifolds in a multi-layer extrusion die and laminated at a die lip inlet. In another such embodiment, block extrusion can be used, in which the first and second polyolefin solutions are first combined into a laminar flow (i.e., in advance), with the laminar flow then connected to a die. Because multi-manifold and block processes are known to those skilled in the art of processing polyolefin films (for example as disclosed in JP06-122142 A, JP06-106599A), they are considered conventional, and therefore their operation will be not described in detail.

Die selection is not critical, and a conventional multi-layer sheet-forming, flat or inflation die can be used. Die gap is not critical. For example, the multi-layer sheet-forming flat die can have a die gap of from about 0.1 mm to about 5 mm. Die temperature and extruding speed are also non-critical parameters. For example, the die can be heated to a die temperature ranging from about 140° C. to about 250° C. during extrusion. The extruding speed can range, for example, from about 0.2 m/minute to about 15 m/minute. The thickness of the layers of the layered extrudate can be independently selected. While the extrusion has been described in terms of embodiments producing two and three-layer extrudates, the extrusion step is not limited thereto. For example, a plurality of dies and/or die assemblies can be used to produce multi-layer extrudates having four or more layers using the extrusion methods of the preceding embodiments. In such a layered extrudate, each surface or intermediate layer can be produced using either the first polyolefin solution and/or the second polyolefin solution.

3. Formation of a Multi-Layer Extrudate

The multi-layer extrudate can be formed into a high polyolefin content multi-layer, extrudate (generally in the form of a gel-like sheet) by cooling, for example. Cooling rate and cooling temperature are not particularly critical. For example, the multi-layer, gel-like sheet can be cooled at a cooling rate of at least about 50° C./minute until the temperature of the multi-layer, gel-like sheet (the cooling temperature) is approximately equal to the multi-layer, gel-like sheet's gelatin temperature (or lower). In an embodiment, the extrudate is cooled to a temperature of about 25° C. or lower in order to form the multi-layer gel-like sheet. While not wishing to be bound by any theory or model, it is believed that cooling the layered extrudate sets the polyolefin micro-phases of the first and second polyolefin solutions for separation by the diluent or solvent. It has been observed that in general a slower cooling rate (e.g., less than 50° C./minute) provides the multi-layer, gel-like sheet with larger pseudo-cell units, resulting in a coarser higher-order structure. On the other hand, a relatively faster cooling rate (e.g., 80° C./minute) results in denser cell units. Although it is not a critical parameter, when the cooling rate of the extrudate is less than 50° C./minute, increased polyolefin crystallinity in the layer can result, which can make it more difficult to process the multi-layer, gel-like sheet in subsequent stretching steps. The choice of cooling method is not critical. For example conventional sheet cooling methods can be used. In an embodiment, the cooling method comprises contacting the layered extrudate with a cooling medium such as cooling air, cooling water, etc. Alternatively, the extrudate can be cooled via contact with rollers cooled by a cooling medium, etc.

By high polyolefin content, we mean the cooled extrudate comprises at least about 15%, for example from about 15 to about 50%, polyolefin derived from the resins of the polyolefin compositions, based on the mass of the cooled extrudate. We believe that a polyolefin content of less than about 15% of the cooled extrudate makes it more difficult to form a microporous membrane structure of the present invention exhibiting the excellent set of properties. A polyolefin content of more than about 50% leads to higher viscosity which makes it more difficult to form the desired membrane structure. The cooled extrudate preferably has a polyolefin content at least as high as that of the polyolefin solution.

4. Stretching the Cooled Extrudate

The cooled extrudate, generally in the form of a high polyolefin content gel-like molding or sheet, is then stretched in at least one direction. While not wishing to be bound by any theory or model, it is believed that the gel-like sheet can be uniformly stretched because the sheet contains the diluent or solvent. The gel-like sheet is preferably stretched to a predetermined magnification after heating by, for example, a tenter method, a roll method, an inflation method or a combination thereof. The stretching may be conducted monoaxially or biaxially, though the biaxial stretching is preferable. In the case of biaxial stretching, any of simultaneous biaxial stretching, sequential stretching or multi-stage stretching (for instance, a combination of the simultaneous biaxial stretching and the sequential stretching) may be used, though the simultaneous biaxial stretching is preferable. The amount of stretch in either direction need not be the same.

The stretching magnification of this first stretching step can be, for example, 2 fold or more, preferably 3 to 30 fold in the case of monoaxial stretching. In the case of biaxial stretching, the stretching magnification can be, for example, 3 fold or more in any direction, namely 9 fold or more, preferably 16 fold or more, more preferably 25 fold or more, e.g. 49 fold or more, in area magnification. An example for this first stretching step would include stretching from about 9 fold to about 400 fold. A further example would be stretching from about 16 to about 49 fold. Again, the amount of stretch in either direction need not be the same. With the area magnification of 9 fold or more, the pin puncture strength of the microporous membrane is improved. When the area magnification is more than 400 fold, stretching apparatuses, stretching operations, etc., involve large-sized stretching apparatuses, which can be difficult to operate.

To obtain a good microporous structure for the present multi-layer membrane, the stretching temperature of this first stretching step is relatively high, preferably from about the crystal dispersion temperature ("Tcd") of the combined polyethylene content of the cooled extrudate to about Tcd+30° C., e.g. in a range of Tcd of the combined polyethylene content to Tcd+25° C., more specifically in a range of Tcd+10° C. to Tcd+25° C., most specifically in a range of Tcd+15° C. to Tcd+25° C. When the stretching temperature is lower than Tcd, it is believed that the combined polyethylene content is so insufficiently softened that the gel-like sheet is easily broken by stretching, failing to achieve high-magnification stretching.

The crystal dispersion temperature is determined by measuring the temperature characteristics of dynamic viscoelasticity according to ASTM D 4065. Because the combined polyethylene content herein has a crystal dispersion temperature of about 90 to 100° C., the stretching temperature is from about 90 to 130° C.; for example from about 100 to 125° C., more specifically from 105 to 125° C.

The above stretching causes cleavage between polyolefin, e.g. polyethylene, lamellas, making the polyolefin phases finer and forming large numbers of fibrils. The fibrils form a three-dimensional network structure. The stretching is believed to improve the mechanical strength of the microporous membrane and expands its pores, making the microporous membrane suitable for use as a battery separator.

Depending on the desired properties, stretching may be conducted with a temperature distribution in a thickness direction, to provide the microporous membrane with further improved mechanical strength. The detailed description of this method is given by Japanese Patent 3347854.

5. Removal of the Diluent or Solvent

The first and second diluents or solvents are removed (or displaced) at least in part from the multi-layer gel-like sheet in order to form a solvent-removed gel-like sheet. A displacing (or "washing") solvent can be used to remove (wash away, or displace) at least a portion of the first and second diluents or solvents. While not wishing to be bound by any theory or model, it is believed that because the polyolefin phases in the multi-layer gel-like sheet produced from the first polyolefin solution and the second polyolefin solution are separated from the diluent or solvent phase, the removal of the diluent or solvent provides a porous membrane constituted by fibrils forming a fine three-dimensional network structure and having pores communicating three-dimensionally and irregularly. The choice of washing solvent is not critical provided it is capable of dissolving or displacing at least a portion of the first and/or second diluent or solvent. Suitable washing solvents include, for example, one or more of volatile solvents such as saturated hydrocarbons exemplified by pentane, hexane, heptane, etc.; chlorinated hydrocarbons exemplified by methylene chloride, carbon tetrachloride, etc.; ethers exemplified by diethyl ether, dioxane, etc.; ketones exemplified by methyl ethyl ketone, etc.; linear fluorocarbons exemplified by trifluoroethane, $C_6F_{14}$, $C_7F_{16}$, etc.; cyclic hydrofluorocarbons exemplified by $C_5H_3F_7$, etc.; hydrofluoroethers exemplified by $C_4F_9OCH_3$, $C_4F_9OC_2H_5$, etc.; and perfluoroethers exemplified by $C_4F_9OCF_3$, $C_4F_9OC_2F_5$, etc.

The method for removing the diluent or solvent is not critical, and any method capable of removing a significant amount of diluent or solvent can be used, including conventional methods. For example, the multi-layer, gel-like sheet can be washed by immersing the sheet in the washing solvent and/or showering the sheet with the washing solvent. The amount of washing solvent used is not critical, and will generally depend on the method selected for removal of the diluent or solvent. For example, the amount of washing solvent used can range from about 300 to about 30,000 parts by mass, based on the mass of the gel-like sheet. While the amount of diluent or solvent removed is not particularly critical, generally a higher quality (more porous) membrane will result when at least a major amount of first and second diluent or solvent is removed from the gel-like sheet. In an embodiment, the diluent or solvent is removed from the gel-like sheet (e.g., by washing) until the amount of the remaining diluent or solvent in the multi-layer gel-like sheet becomes less than 1 wt. %, based on the weight of the gel-like sheet.

The multi-layer microporous membrane deprived of the diluent or solvent can be dried by a heat-drying method, a wind-drying (e.g., air drying using moving air) method, etc., to remove remaining volatile components from the membrane, e.g. washing solvent. Any drying method capable of removing a significant amount of the washing solvent can be used. Preferably, substantially all of the washing solvent is removed during drying. The drying temperature is preferably equal to or lower than Tcd, more preferably 5° C. or more lower than Tcd. Drying is conducted until the remaining washing solvent becomes preferably 5% or less by mass, more preferably 3% or less by mass, per 100% by mass (on a dry basis) of the microporous membrane. Insufficient drying undesirably can lead to decrease in the porosity of the microporous membrane by the subsequent heat treatment, resulting in poor permeability.

6. Stretching the Solvent-Deprived and/or Dried Membrane

The diluent or solvent-deprived and/or dried multi-layer membrane is stretched in a second stretching step (re-stretched) at least monoaxially at high magnification. The re-stretching of the membrane can be conducted, for example, while heating, by a tenter method, etc., as in the first stretching step. The re-stretching may be monoaxial or biaxial. In the case of biaxial stretching, any one of simultaneous biaxial stretching or sequential stretching may be used, though the simultaneous biaxial stretching is preferable. Because the re-stretching is usually conducted on the membrane in a long sheet form, which is obtained from the stretched gel-like sheet, the directions of MD and TD (where MD means "machine direction", i.e., the direction of membrane travel during processing, and TD means "transverse direction", i.e., a direction orthogonal to both the MD and the horizontal surface of the membrane) in the re-stretching is usually the same as those in the stretching of the cooled extrudate. In the present invention, however, the re-stretching is actually somewhat greater than that used in the stretching of the cooled extrudate. Stretching magnification in this step is from about 1.1 to about 1.8 fold in at least one direction, for example from about 1.2 to about 1.6 fold. Stretching need not be the same magnification in each direction. If stretching in step (4) of the present method is lower in the range of from about 9 to about 400, then stretching in step (6) of the present method should be higher in the range of from about 1.1 to about 1.8. Likewise, if stretching in step (4) of the present method is higher in the range of from about 9 to about 400, then stretching in step (6) of the present method should be lower in the range of from about 1.1 to about 1.8.

The second stretching or re-stretching is conducted at a second temperature preferably equal to Tm or lower, more preferably in a range of Tcd to Tm. When the second stretching temperature is higher than Tm, it is believed that the melt viscosity is generally too low to conduct good stretching, resulting in low permeability. When the second stretching temperature is lower than Tcd, it is believed that the polyolefin is insufficiently softened so that the membrane might be broken by stretching, i.e., a failure to achieve uniform stretching. In an embodiment, the second stretching temperature is usually from about 90 to about 135° C., for example from about 95 to about 130° C.

The monoaxial stretching magnification of the membrane in this step, as mentioned above, is preferably from about 1.1 to about 1.8 fold. A magnification of 1.1 to 1.8 fold generally provides the membrane of the present invention with a structure having a large average pore size. In the case of monoaxial stretching, the magnification can be form 1.1 to 1.8 fold in a longitudinal or transverse direction. In the case of biaxial stretching, the membrane may be stretched at the same or different magnifications in each stretching direction, though preferably the same, as long as the stretching magnifications in both directions are within 1.1 to 1.8 fold.

When the second stretching magnification of the membrane is less than 1.1 fold, it is believed that the membrane structure of the present invention has poorer permeability, electrolytic solution absorption and compression resistance in the membrane. When the second stretching magnification is more than 1.8 fold, the fibrils formed are too fine, and it is believed that the heat shrinkage resistance and the electrolytic solution absorption characteristics of the membrane are reduced. This second stretching magnification is more preferably from 1.2 to 1.6 fold.

The stretching rate is preferably 3%/second or more in a stretching direction. In the case of monoaxial stretching, stretching rate is 3%/second or more in a longitudinal or transverse direction. In the case of biaxial stretching, stretching rate is 3%/second or more in both longitudinal and transverse directions. A stretching rate of less than 3%/second decreases the membrane's permeability, and provides the membrane with large unevenness in properties (particularly, air permeability) in a width direction when stretched in a transverse direction. The stretching rate is preferably 5%/second or more, more preferably 10%/second or more. Though not particularly critical, the upper limit of the stretching rate is preferably 50%/second to prevent rupture of the membrane.

7. Heat Treatment

The membrane product of step (6) of the present method is thermally treated (heat-set) to stabilize crystals and make uniform lamellas in the membrane. The heat-setting is preferably conducted by a tenter method or a roll method. The heat-setting temperature is preferably in a range of Tcd to Tm. It is believed that too low a heat-setting temperature deteriorates the membrane's pin puncture strength, tensile rupture strength, tensile rupture elongation and heat shrinkage resistance, while too high a heat-setting temperature deteriorates membrane permeability.

An annealing treatment can be conducted after the heat-setting step. The annealing is a heat treatment with no load applied to the multi-layer microporous membrane, and may be conducted by using, e.g., a heating chamber with a belt conveyer or an air-floating-type heating chamber. The annealing may also be conducted continuously after the heat-setting with the tenter slackened. The annealing temperature is preferably Tm or lower, more preferably in a range from about 60° C. to about Tm–5° C. Annealing is believed to provide the multi-layer microporous membrane with high permeability and strength. Optionally, the multi-layer membrane is annealed without prior heat-setting. In an embodiment, the heat-setting of step (7) is optional.

8. Heat-Setting Treatment of Stretched Sheet

The stretched sheet between steps (4) and (5) may be heat-set, provided this heat setting does not deteriorate the properties of the multi-layer microporous membrane. The heat-setting method may be conducted the same way as described above for step (7).

9. Heat Roller Treatment

At least one surface of the stretched sheet from step (4) may be brought into contact with one or more heat rollers following any of steps (4) to (7). The roller temperature is preferably in a range of from Tcd+10° C. to Tm. The contact time of the heat roll with the stretched sheet is preferably from about 0.5 second to about 1 minute. The heat roll may have a flat or rough surface. The heat roll may have a suction functionality to remove the solvent. Though not particularly critical, one example of a roller-heating system may comprise holding heated oil in contact with a roller surface.

10. Hot Solvent Treatment

The stretched sheet may be contacted with a hot solvent between steps (4) and (5). A hot solvent treatment turns fibrils formed by stretching to a leaf vein form with relatively thick fiber trunks, providing the multi-layer microporous membrane with large pore size and suitable strength and permeability. The term "leaf vein form" means that the fibrils have thick fiber trunks, and thin fibers extending in a complicated network structure from the trunks. The details of the hot solvent treatment method are described in WO 2000/20493.

11. Heat-Setting of Membrane Containing Washing Solvent

The microporous membrane containing a washing solvent between steps (5) and (6) may be heat-set to a degree that does not deteriorate the properties of the multi-layer microporous membrane. The heat-setting method may be the same as described above in step (7).

12. Cross-Linking

The heat-set multi-layer microporous membrane may be cross-linked by ionizing radiation rays such as α-rays, β-rays, γ-rays, electron beams, etc. In the case of irradiating electron beams, the amount of electron beams is preferably from about 0.1 to about 100 Mrad, and the accelerating voltage is preferably form about 100 to about 300 kV. The cross-linking treatment elevates the melt down temperature of the multi-layer microporous membrane.

13. Hydrophilizing Treatment

The heat-set multi-layer microporous membrane may be subjected to a hydrophilizing treatment (a treatment that makes the membrane more hydrophilic). The hydrophilizing treatment may be a monomer-grafting treatment, a surfactant treatment, a corona-discharging treatment, etc. The monomer-grafting treatment is preferably conducted after the cross-linking treatment.

In the case of surfactant treatment hydrophilizing the heat-set microporous membrane, any of nonionic surfactants, cationic surfactants, anionic surfactants and amphoteric surfactants may be used, and the nonionic surfactants are preferred. The microporous membrane can be dipped in a solution of the surfactant in water or a lower alcohol such as methanol, ethanol, isopropyl alcohol, etc., or coated with the solution by a doctor blade method.

14. Surface-Coating Treatment

While not required, the heat-set microporous membrane resulting from step (7) can be coated with porous polypropylene, porous fluororesins such as polyvinylidene fluoride and polytetrafluoroethylene, porous polyimides, porous polyphenylene sulfide, etc., to improve melt down properties when the membrane is used as a battery separator. The polypropylene used for the coating preferably has Mw of form about 5,000 to about 500,000, and a solubility of about 0.5 grams or more in 100 grams of toluene at 25° C. Such polypropylene more preferably has a racemic diade fraction of from about 0.12 to about 0.88, the racemic diade being a structural unit in which two adjacent monomer units are mirror-image isomers to each other. The surface-coating layer may be applied, for instance, by applying a solution of the above coating resin in a good solvent to the microporous membrane, removing part of the solvent to increase a resin concentration, thereby forming a structure in which a resin phase and a solvent phase are separated, and removing the remainder of the solvent. Examples of good solvents for this purpose include aromatic compounds, such as toluene or xylene.

[4] Lamination

The choice of lamination technique or method is not particularly critical, and conventional lamination methods such as heat-induced lamination can be used to laminate the multi-layer gel-like sheet. Other suitable lamination methods include, for example, heat-sealing, impulse-sealing, ultrasonic-bonding, etc., either alone or in combination. Heat-sealing can be conducted using, e.g., one or more pair of heated rollers where the gel-like sheets are conducted through at least one pair of the heated rollers. Although the heat-sealing temperature and pressure are not particularly critical, sufficient heating and pressure should be applied for a sufficient time to ensure that the gel-like sheets are appropriately bonded to provide a multi-layer, microporous membrane with relatively uniform properties and little tendency toward delamination. In an embodiment, the heat-sealing temperature can be, for instance, about 90° C. to about 135° C., or from about 90° C. to about 115° C. In an embodiment, the heat-sealing pressure can be from about 0.01 MPa to about −50 MPa.

The thickness of the layers formed from the first and second polyolefin solutions (i.e., the layers comprising the first and second microporous layer materials) can be controlled by adjusting the thickness of the first and second gel-like sheets and by the amount of stretching (stretching magnification and dry stretching magnification), when one or more stretching steps are used. Optionally, the lamination step can be combined with a stretching step by passing the gel-like sheets through multi-stages of heated rollers.

[5] Properties of the Multi-Layer Microporous Membrane

In an embodiment, the multi-layer microporous membrane has a thickness ranging from about 3 μm to about 200 μm, or about 5 μm to about 50 μm. Optionally, the multi-layer microporous membrane has one or more of the following characteristics.

A. Porosity of About 25% to About 80%

When the porosity is less than 25%, the multi-layer microporous membrane generally does not exhibit the desired air permeability for use as a battery separator. When the porosity exceeds 80%, it is more difficult to produce a battery separator of the desired strength, which can increase the likelihood of internal electrode short-circuiting.

B1. Air Permeability of About 20 Seconds/100 cm³ to about 400 Seconds/100 cm³ (Converted to Value at 20 μm thickness)

When the air permeability of the multi-layer microporous membrane (as measured according to JIS P8117) ranges from about 20 seconds/100 cm³ to about 400 seconds/100 cm³, it is less difficult to form batteries having the desired charge storage capacity and desired cyclability. When the air permeability is less than about 20 seconds/100 cm³, it is more difficult to produce a battery having the desired shutdown characteristics, particularly when the temperature inside the battery is elevated. Air permeability $P_1$ measured on a multi-layer microporous membrane having a thickness $T_1$ according to JIS P8117 can be converted to air permeability $P_2$ at a thickness of 20 μm by the equation of $P_2=(P_1 \times 20)/T_1$.

B2. Air Permeability After Heat Compression of About 100 Seconds/100 cm³ to About 700 Seconds/100 cm³

The present multi-layer microporous membrane when heat-compressed at 90° C. under pressure of 2.2 MPa for 5 minutes has air permeability (as measured according to JIS P8117) of about 700 sec/100 cm³ or less, such as from about 100 to about 700 sec/100 cm³. Batteries using such membranes have suitably large capacity and cyclability. The air permeability after heat compression is preferably, for example, 650 sec/100 cm³ or less.

C. Pin Puncture Strength of About 3,500 mN/20 μm or More

The pin puncture strength (converted to the value at a 20 μm membrane thickness) is the maximum load measured when the multi-layer, microporous membrane is pricked with a needle 1 mm in diameter with a spherical end surface (radius R of curvature: 0.5 mm) at a speed of 2 mm/second. When the pin puncture strength of the multi-layer, microporous membrane is less than 2,000 mN/20 μm, it is more difficult to produce a battery having the desired mechanical integrity, durability, and toughness. The pin puncture strength is preferably 3,000 mN/20 μm or more, for example, 4,000 mN/20 μm or more.

D. Tensile Strength of at Least About 49,000 kPa

When the tensile strength according to ASTM D882 of the multi-layer, microporous membrane is at least about 49,000 kPa in both longitudinal and transverse directions, it is less difficult to produce a battery of the desired mechanical strength. The tensile strength is preferably about 60,000 kPa or more, for example about 80,000 kPa or more, or about 100,000 kPa or more.

E. Tensile Elongation of at Least About 100%

When the tensile elongation according to ASTM D882 of the multi-layer, microporous membrane is 100% or more in both longitudinal and transverse directions, it is less difficult to produce a battery having the desired mechanical integrity, durability, and toughness.

F. Heat Shrinkage Ratio of 12% or Less

When the heat shrinkage ratio measured after holding the multi-layer, microporous membrane at a temperature of about 105° C. for 8 hours exceeds 12% in both longitudinal and transverse directions, it is more difficult to produce a battery that will not exhibit internal short-circuiting when the heat generated in the battery results in the shrinkage of the separators.

G. Shut Down Temperature of About 140° C. or Lower

When the shutdown temperature of the multi-layer, microporous polyolefin membrane exceeds 140° C., it is more difficult to produce a battery separator with the desired shutdown response when the battery is overheated. One way to determine shutdown temperature involves determining the temperature at a point of inflection observed near the melting point of the multi-layer, microporous membrane, under the condition that a test piece of 3 mm in the longitudinal direction and 10 mm in the transverse direction is heated from room temperature at a speed of 5° C./minute while drawing the test piece in the longitudinal direction under a load of 2 grams.

H. Melt Down Temperature of at Least About 150° C.

In an embodiment, the melt down temperature can range from about 150° C. to about 190° C. One way to measure melt down temperature involves determining the temperature at which a multi-layer microporous membrane test piece of 3 mm in the longitudinal direction and 10 mm in the transverse direction is broken by melting, under the conditions that the test piece is heated from room temperature at a heating rate of 5° C./minute while drawing the test piece in the longitudinal direction under a load of 2 grams.

I. Battery capacity Recovery Ratio of 70% or More (Retention Property of Lithium Ion Secondary Battery)

When a lithium ion secondary battery comprising a separator formed by a multi-layer microporous membrane is stored at a temperature of 80° C. for 30 days, it is desired that the battery capacity recovery ratio [(capacity after high-temperature storing)/(initial capacity)]×100(%) should be 70% or more. The battery capacity recovery ratio is preferably 75% or more.

J. Maximum Shrinkage in Molten State of 20% or Less

The multi-layer microporous membrane should exhibit a maximum shrinkage in the molten state (about 140° C.) of about 20% or less, preferably about 15% or less.

K. Surface roughness of About $3 \times 10^2$ nm or More

The surface roughness of the membrane measured by an atomic force microscope (AFM) in a dynamic force mode is generally $3 \times 10^2$ nm or more (measured as the maximum height difference). The membrane's surface roughness is preferably from about $3.0 \times 10^2$ nm to about $1.0 \times 10^3$ nm.

L. Thickness Variation Ratio of 20% or Less After Heat Compression

The thickness variation ratio after heat compression at 90° C. under pressure of 2.2 MPa for 5 minutes is generally 20% or less per 100% of the thickness before compression. Batteries comprising microporous membrane separators with a thickness variation ratio of 20% or less have suitably large capacity and good cyclability.

[6] Battery Separator

In an embodiment, the battery separator formed from any of the above multi-layer microporous membranes of the present invention has a thickness of form about 3 to about 200 µm, or from about 5 to about 50 µm, or from about 7 to about 35 µm, though the most suitable thickness is properly selected depending on the type of battery to be manufactured.

[7] Battery

In an embodiment, the multi-layer microporous membrane of the present invention can be used as a separator for primary and secondary batteries such as lithium ion batteries, lithium-polymer secondary batteries, nickel-hydrogen secondary batteries, nickel-cadmium secondary batteries, nickel-zinc secondary batteries, silver-zinc secondary batteries, and particularly for lithium ion secondary batteries. Explanations will be made below on the lithium ion secondary batteries.

The lithium ion secondary battery comprises a cathode, an anode, and a separator located between the anode and the cathode. The separator generally contains an electrolytic solution (electrolyte). The electrode structure is not critical, and conventional electrode structures can be used. The electrode structure may be, for instance, a coin type in which a disc-shaped cathode and anode are opposing, a laminate type in which a planar cathode and anode are alternately laminated with at least one separator situated between the anode and the cathode, a toroidal type in which ribbon-shaped cathode and anode are wound, etc.

The cathode generally comprises a current collector, and a cathodic-active material layer capable of absorbing and discharging lithium ions, which is formed on the current collector. The cathodic-active materials can be, for example, inorganic compounds such as transition metal oxides, composite oxides of lithium and transition metals (lithium composite oxides), transition metal sulfides, etc. The transition metals can be, for example, V, Mn, Fe, Co, Ni, etc. In an embodiment, the lithium composite oxides are lithium nickelate, lithium cobaltate, lithium manganate, laminar lithium composite oxides based on α-NaFeO$_2$, etc. The anode generally comprises a current collector, and a negative-electrode active material layer formed on the current collector. The negative-electrode active materials can be, for example, carbonaceous materials such as natural graphite, artificial graphite, cokes, carbon black, etc.

The electrolytic solutions can be obtained by dissolving lithium salts in organic solvents. The choice of solvent and/or lithium salt is not critical, and conventional solvents and salts can be used. The lithium salts can be, for example, LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$C$_{10}$, LiN(C$_2$F$_5$SO$_2$)$_2$, LiPF$_3$(C$_2$F$_5$)$_3$, lower aliphatic carboxylates of lithium, LiAlCl$_4$, etc. The lithium salts may be used alone or in combination. The organic solvents can be organic solvents having relatively high boiling points (compared to the battery's shut-down temperature) and high dielectric constants. Suitable organic solvents include ethylene carbonate, propylene carbonate, ethylmethyl carbonate, γ-butyrolactone, etc.; organic solvents having low boiling points and low viscosity such as tetrahydrofuran, 2-methyltetrahydrofuran, dimethoxyethane, dioxolane, dimethyl carbonate, diethyl carbonate, and the like, including mixtures thereof. Because the organic solvents generally having high dielectric constants generally also have a high viscosity, and vice versa, mixtures of high- and low-viscosity solvents can be used.

When the battery is assembled, the separator is generally impregnated with the electrolytic solution, so that the separator (multi-layer microporous membrane) is provided with ion permeability. The choice of impregnation method is not critical, and conventional impregnation methods can be used. For example, the impregnation treatment can be conducted by immersing the multi-layer microporous membrane in an electrolytic solution at room temperature.

The method selected for assembling the battery is not critical, and conventional battery assembly methods can be used. For example, when a cylindrical battery is assembled, a cathode sheet, a separator formed by the multi-layer microporous membrane and an anode sheet are laminated in this order, and the resultant laminate is wound to a toroidal-type electrode assembly. A second separator might be needed to prevent short-circuiting of the toroidal windings. The resultant electrode assembly can be deposited into a battery can and then impregnated with the above electrolytic solution, and the battery lid acting as a cathode terminal provided with a safety valve can be caulked to the battery can via a gasket to produce a battery. The battery can be used as a source or sink of electric charge.

[8] Examples

The present invention will be explained in more detail referring to Examples below without intention of restricting the scope of the present invention.

Example 1

Preparation of First Polyolefin Solution

A first polyolefin composition comprising (a) 50% first polyethylene resin having a weight average molecular weight of $3.0 \times 10^5$ and a molecular weight distribution of 8.6, (b) 37.5% first polypropylene resin having a weight average molecular weight of $1.1 \times 10^6$, a heat of fusion of 114 J/g and a molecular weight distribution of 5, (c) 12.5% second polypropylene resin having a weight average molecular weight of $6.6 \times 10^5$, a heat of fusion of 103.3 J/g and a molecular weight distribution of 11.4, and (a') no added second polyethylene resin, is prepared by dry-blending, percentages by weight of the first polyolefin composition. The polyethylene resin in the composition has a melting point of 135° C. and a crystal dispersion temperature of 100° C.

The Mw and Mw/Mn of polyethylene for all examples are measured by a gel permeation chromatography (GPC) method under the following conditions.

Measurement apparatus: GPC-150C available from Waters Corporation,

Column: Shodex UT806M available from Showa Denko K.K.,

Column temperature: 135° C.,
Solvent (mobile phase): o-dichlorobenzene,
Solvent flow rate: 1.0 ml/minute, Sample concentration: 0.1% by weight (dissolved at 135° C. for 1 hour),
Injected amount: 500 μl,
Detector: Differential Refractometer available from Waters Corp., and
Calibration curve: Produced from a calibration curve of a single-dispersion, standard polystyrene sample using a predetermined conversion constant.

Twenty-five parts by weight of the resultant first polyolefin composition is charged into a strong-blending double-screw extruder having an inner diameter of 58 mm and L/D of 42, and 75 parts by mass of liquid paraffin (50 cst at 40° C.) is supplied to the double-screw extruder via a side feeder. Melt-blending is conducted at 210° C. and 200 rpm to prepare a first polyolefin solution.

(2) Preparation of Second Polyolefin Solution

A second polyolefin solution is prepared in the same manner as above except as follows. A second polyolefin composition comprising (a) 80% first polyethylene resin having a weight average molecular weight of $3.0 \times 10^5$ and a molecular weight distribution of 8.6, and (a') 20% second polyethylene resin having a weight average molecular weight of $2 \times 10^6$ and a molecular weight distribution of 8, is prepared by dry-blending, percentages by weight of the second polyolefin composition. The polyethylene resin in the composition has a melting point of 135° C. and a crystal dispersion temperature of 100° C.

Thirty parts by weight of the resultant second polyolefin composition is charged into a strong-blending double-screw extruder having an inner diameter of 58 mm and L/D of 42, and 70 parts by mass of liquid paraffin (50 cst at 40° C.) is supplied to the double-screw extruder via a side feeder. Melt-blending is conducted at 210° C. and 200 rpm to prepare a second polyolefin solution.

(3) Production of Membrane

The first and second polyolefin solutions are supplied from their double-screw extruders to a three-layer-extruding T-die, and extruded therefrom to form an extrudate (also called a laminate) of first polyolefin solution layer/second polyolefin solution layer/first polyolefin solution layer at a layer thickness ratio of 10/80/10. The extrudate is cooled while passing through cooling rollers controlled at 0° C., to form a three-layer gel-like sheet, which is simultaneously biaxially stretched at 115° C. to a magnification of 5 fold in both machine (longitudinal) and transverse directions by a tenter-stretching machine. The stretched three-layer gel-like sheet is fixed to an aluminum frame of 20 cm×20 cm, immersed in a bath of methylene chloride controlled at 25° C. to remove liquid paraffin with vibration of 100 rpm for 3 minutes, and dried by air flow at room temperature. The dried membrane is re-stretched by a batch-stretching machine to a magnification of 1.4 fold in a transverse direction at 129° C. The re-stretched membrane, which remains fixed to the batch-stretching machine, is heat-set at 125° C. for 10 minutes to produce a three-layer microporous membrane.

Example 2

Example 1 is repeated except the first and second microporous polyolefin membranes were laminated in an order of first microporous membrane/second microporous membrane/first microporous membrane at a layer thickness ratio of 25/50/25.

Example 3

Example 1 is repeated except the first polyolefin composition of the first polyolefin solution comprises 25% first polypropylene resin and 25% second polypropylene resin along with the 50% first polyethylene resin, percentages by weight of the first polyolefin composition.

Example 4

Example 1 is repeated except the first polyolefin composition of the first polyolefin solution comprises 60% first polyethylene resin, 25% first polypropylene resin, and 15% second polypropylene resin, percentages by weight of the first polyolefin composition.

Example 5

Example 4 is repeated except the dried membrane is re-stretched by a batch-stretching machine to a magnification of 1.4 fold in the transverse direction and 1.2 fold in the machine direction at 129° C.

Example 6

Example 1 is repeated except the second polypropylene resin in the first polyolefin composition has a weight average molecular weight of $5.7 \times 10^5$, a heat of fusion of 94.6 J/g and a molecular weight distribution of 5.9.

Example 7

Example 1 is repeated except the first polypropylene resin in the first polyolefin composition has a weight average molecular weight of $0.9 \times 10^6$, a heat of fusion of 106 J/g and a molecular weight distribution of 4.5.

Comparative Example 1

Example 1 is repeated except the first and second microporous polyolefin membranes are laminated in an order of first microporous membrane/second microporous membrane/first microporous membrane at a layer thickness ratio of 40/20/40.

Comparative Example 2

Example 1 is repeated except the first and second microporous polyolefin membranes are laminated in an order of second microporous membrane/first microporous membrane/second microporous membrane at a layer thickness ratio of 10/80/10.

Comparative Example 3

Example 1 is repeated except that there is no re-stretching of the dried membrane.

Comparative Example 4

Example 1 is repeated except the first polyolefin composition of the first polyolefin solution comprises 50% first polyethylene resin and 50% first polypropylene resin, percentages by weight of the first polyolefin composition. There is no second polypropylene resin in this first polyolefin composition.

Comparative Example 5

Example 1 is repeated except the first polyolefin composition of the first polyolefin solution comprises 50% first polyethylene resin and 50% second polypropylene resin, percentages by weight of the first polyolefin composition. There is no first polypropylene resin in this first polyolefin composition.

Comparative Example 6

Example 1 is repeated except the first polyolefin composition of the first polyolefin solution comprises 12.5% first polypropylene resin and 37.5% second polypropylene resin along with the 50% first polyethylene resin, percentages by weight of the first polyolefin composition.

Comparative Example 7

Example 1 is repeated except the first polyolefin composition of the first polyolefin solution comprises 25% first polyethylene resin and 25% second polyethylene resin having a weight average molecular weight of $2 \times 10^6$ and a molecular weight distribution of 8, percentages by weight of the first polyolefin composition.

Comparative Example 8

Example 1 is repeated except with the first polyolefin composition of the first polyolefin solution comprising 80% first polyethylene resin and 20% second polyethylene resin having a weight average molecular weight of $2 \times 10^6$ and a molecular weight distribution of 8, percentages by weight of the first polyolefin composition. There are no first or second polypropylene resins in this first polyolefin composition, and no re-stretching of the dried three-layer membrane.

Properties

The properties of the multi-layer microporous membranes of Examples 1-8 and Comparative Examples 1-8 are measured by the following methods. The results are shown in Tables 1 and 2.

(1) Average thickness (μm)

The thickness of each microporous membrane is measured by a contact thickness meter at 5 cm longitudinal intervals over the width of 30 cm, and averaged. The thickness meter used is a Litematic made by Mitsutoyo Corporation.

(2) Air Permeability (sec/100 cm³/20 μm)

Air permeability $P_1$ measured on each microporous membrane having a thickness $T_1$ according to JIS P8117 is converted to air permeability $P_2$ at a thickness of 20 μm by the equation of $P_2=(P_1\times 20)/T_1$.

(3) Porosity (%)

Measured by a weight method using the formula: Porosity %=100×(w2−w1)/w2, wherein "w1" is the actual weight of film and "w2" is the assumed weight of 100% polyethylene.

(4) Pin Puncture Strength (mN/20 μm)

The maximum load is measured when each microporous membrane having a thickness of $T_1$ is pricked with a needle of 1 mm in diameter with a spherical end surface (radius R of curvature: 0.5 mm) at a speed of 2 mm/second. The measured maximum load $L_1$ is converted to the maximum load $L_2$ at a thickness of 20 μm by the equation of $L_2=(L_1\times 20)/T_1$, and used as pin puncture strength.

(5) Tensile Strength and Tensile Elongation

They are measured on a 10 mm wide rectangular test piece according to ASTM D882.

(6) Heat Shrinkage Ratio (%)

The shrinkage ratios of each microporous membrane in both longitudinal and transverse directions are measured three times when exposed to 105° C. for 8 hours, and averaged to determine the heat shrinkage ratio.

(7) Shut Down Temperature

Using a thermomechanical analyzer (TMA/SS6000 available from Seiko Instruments, Inc.), a test piece of 10 mm in transverse direction and 3 mm in longitudinal direction is heated from room temperature at a rate of 5° C./minute while drawing the test piece in a longitudinal direction under a load of 2 g. A temperature at a point of inflection observed near the melting point is defined as the shutdown temperature.

(8) Melt Down Temperature (° C.) and (9) Maximum Shrinkage in Molten State

The melt down temperature and maximum shrinkage in the molten state are measured as follows: A rectangular sample of 3 mm×50 mm is cut out of the microporous membrane such that the longitudinal direction of the sample is aligned with the transverse direction of the microporous membrane, and set in a thermomechanical analyzer (TMA/SS6000 available from Seiko Instruments, Inc.) at a chuck distance of 10 mm. With a load of 19.6 mN applied to a lower end of the sample, the temperature is elevated at a rate of 5° C./minute to measure its size change. A size change ratio is calculated relative to the size at 23° C., to obtain a temperature-size change ratio curve. The maximum shrinkage ratio in the molten state is observed in a temperature range of from 135° C. to 145° C. The maximum shrinkage in the molten state is measured at 140° C. Melt down temperature is the temperature at which the membrane breaks.

(10) Thickness Variation Ratio After Heat Compression (%)

A microporous membrane sample is situated between a pair of highly flat plates, and heat-compressed by a press machine under a pressure of 2.2 MPa (22 kgf/cm²) at 90° C. for 5 minutes, to determine an average thickness in the same manner as above. A thickness variation ratio is calculated by the formula of (average thickness after compression−average thickness before compression)/(average thickness before compression)×100.

(11) Capacity Recovery Ratio

The capacity recovery ratio of a lithium ion battery containing the multi-layer microporous membrane as a separator is measured as follows: First, the discharge capacity (initial capacity) of the lithium ion battery is measured by a charge/discharge tester before high temperature storage. After being stored at a temperature of 80° C. for 30 days, the discharge capacity is measured again by the same method to obtain the capacity after high temperature storage. The capacity recovery ratio (%) of the battery is determined by the following equation: Capacity recovery ratio (%)=[(capacity after high temperature storage)/(initial capacity)]×100.

(12) Surface Roughness

The maximum height difference of a surface measured by AFM in a dynamic force mode (DFM) is used as surface roughness.

(13) Electrolytic Solution Absorption Speed

Using a dynamic surface tension measuring apparatus (DCAT21 with high-precision electronic balance, available from Eko Instruments Co., ltd.), a multi-layer microporous membrane sample is immersed in an electrolytic solution (electrolyte: 1 mol/L of $LiPF_6$, solvent: ethylene carbonate/dimethyl carbonate at a volume ratio of 3/7) kept at 18° C., to determine an electrolytic solution absorption speed by the formula of [weight increment (g) of microporous membrane/weight (g) of microporous membrane before absorption]. The electrolytic solution absorption speed is expressed by a relative value, assuming that the electrolytic solution absorption rate in the microporous membrane of Comparative Example 8 is 1.

(14) Air Permeability After Heat Compression (sec/100 cm$^3$)

Each multi-layer microporous membrane having a thickness of $T_1$ is heat-compressed under the above conditions, and measured with respect to air permeability $P_1$ according to JIS P8117.

It is noted from Table 1 that the multi-layer microporous membrane of the present invention has well-balanced properties, including air permeability, pin puncture strength, tensile strength, tensile elongation, shut down temperature and melt down temperature, as well as excellent electrolytic solution absorption, with little variation of thickness and air per-

TABLE 1

| PROPERTIES | Ex 1 | Ex 2 | Ex 3 | Ex 4 | Ex 5 | Ex 6 | Ex 7 |
|---|---|---|---|---|---|---|---|
| Thickness μm | 17.9 | 18.0 | 18.1 | 18.2 | 18.0 | 18.3 | 18.2 |
| Air Perm. | 260 | 310 | 240 | 250 | 270 | 260 | 240 |
| Porosity % | 53.1 | 56.3 | 57.8 | 52.1 | 51.8 | 52.8 | 54.6 |
| Punct. Strength | 4116 | 3626 | 3920 | 4410 | 4508 | 4018 | 4214 |
| Tensile Strength MD//TD | 116620 117600 | 89180 90160 | 110740 111720 | 122500 117600 | 119560 115640 | 115640 116620 | 117600 116620 |
| Tensile Elongation MD//TD | 145 140 | 135 140 | 140 140 | 150 155 | 145 150 | 145 140 | 145 140 |
| Heat Shrinkage MD//TD | 5.8 8.7 | 5.6 8.5 | 5.5 8.4 | 5.3 8.3 | 5.7 2.3 | 5.9 8.8 | 5.6 8.5 |
| Surface Roughness (×10$^2$ nm) | 3.4 | 3.4 | 3.2 | 3.3 | 3.4 | 3.8 | 3.5 |
| Elec. Soln. Absorp. Speed | 3.7 | 4 | 4.5 | 3.6 | 3.5 | 3.7 | 3.8 |
| Thick. Var. Aft. Heat Comp. % | −9 | −7 | −6 | −8 | −7 | −10 | −10 |
| Air Perm. Aft. Heat Comp. | 520 | 610 | 480 | 490 | 530 | 530 | 490 |
| Meltdown Temp. °C. | 176 | 178 | 174 | 172 | 171 | 175 | 177 |
| Max. Shrinkage %* | 11.8 | 11.5 | 9.9 | 12.3 | 7.8 | 11.6 | 11.7 |
| Cap. Recovery Ratio % | 81 | 82 | 80 | 78 | 78 | 80 | 81 |
| Shutdown Temp. °C. | 135 | 135 | 135 | 135 | 135 | 135 | 135 |

*Maximum Shrinkage in Molten State (% at about 140° C.)

TABLE 2

| PROPERTIES | Comp Ex 1 | Comp Ex 2 | Comp Ex 3 | Comp Ex 4 | Comp Ex 5 | Comp Ex 6 | Comp Ex 7 | Comp Ex 8 |
|---|---|---|---|---|---|---|---|---|
| Thickness μm | 17.8 | 18.2 | 18.3 | 18.4 | 18.2 | 18.0 | 18.1 | 18.2 |
| Air Perm. | 420 | 440 | 360 | 280 | 230 | 250 | 270 | 490 |
| Porosity % | 56.7 | 57.3 | 45.2 | 50.3 | 55.2 | 54.8 | 54.2 | 38.3 |
| Punct. Strength | 2842 | 2646 | 3724 | 4214 | 2842 | 3136 | 3724 | 5292 |
| Tensile Strength MD//TD | 72520 73500 | 68600 69580 | 78400 116620 | 117600 118580 | 73500 74480 | 75460 77420 | 98000 98980 | 179340 141120 |
| Tensile Elongation MD//TD | 125 125 | 125 125 | 190 140 | 150 145 | 130 130 | 130 130 | 140 140 | 140 240 |
| Heat Shrinkage MD//TD | 5.3 8.2 | 3.3 5.9 | 8.0 5.0 | 7.1 10.1 | 6.2 8.9 | 6.5 8.7 | 6.3 9.4 | 6.0 5.5 |
| Surface Roughness (×10$^2$ nm) | 3.3 | 2.3 | 3.3 | 3.2 | 33 | 15 | 3.4 | 2.2 |
| Elec. Soln. Absorp. Speed | 4 | 1.1 | 2.9 | 2.3 | 4.8 | 4.6 | 3.4 | 1 |
| Thick. Var. Aft. Heat Comp. % | −6 | −15 | −15 | −8 | −16 | −8 | −8 | −20 |
| Air Perm. Aft. Heat Comp. | 800 | 1210 | 1010 | 780 | 550 | 630 | 520 | 1020 |
| Meltdown Temp. °C. | 179 | 175 | 173 | 179 | 162 | 169 | 177 | 148 |
| Max. Shrinkage %* | 11.1 | 8.8 | 4.8 | 15.8 | 4.3 | 5.2 | 35.1 | 32.0 |
| Cap. Recovery Ratio % | 81 | 70 | 79 | 79 | 80 | 80 | 77 | 63 |
| Shutdown Temp. °C. | 135 | 135 | 135 | 135 | 135 | 135 | 135 | 135 |

*Maximum Shrinkage in Molten State (% at about 140° C.)

meability after heat compression. Lithium ion secondary batteries comprising the multi-layer microporous membranes of the present invention have capacity recovery ratios of 75% or more, indicating desirable high temperature retention properties.

On the other hand, the microporous membrane products of the Comparative Examples exhibit a poorer balance of properties.

The multi-layer microporous membrane of the present invention has well-balanced properties and use of such multi-layer microporous membrane as a battery separator provides batteries having excellent safety, heat resistance, retention properties and productivity.

The invention can be further described in terms of the following non-limiting embodiments:

1. A multi-layer microporous membrane comprising at least one first microporous membrane layer and at least one second microporous membrane layer in planar contact one with the other, wherein said first microporous membrane layer comprises a first polyethylene, a first polypropylene, and a second polypropylene different from the first polypropylene; and wherein said second microporous membrane layer comprises a first polyethylene and a second polyethylene.

2. The membrane of embodiment 1 wherein
the first layer comprises (a) from about 30 to about 70% of the first polyethylene, the first polyethylene having a weight average molecular weight of from about $2.5 \times 10^5$ to about $5 \times 10^5$ and a molecular weight distribution of from about 5 to about 100, (b) from about 20 to about 40% of the first polypropylene, the first polypropylene having a weight average molecular weight of from about $0.8 \times 10^6$ to about $1.5 \times 10^6$, a molecular weight distribution of from about 1 to about 100 and a heat of fusion of 80 J/g or higher, and (c) from about 10 to about 30% of the second polypropylene, the second polypropylene having a weight average molecular weight of from about $4 \times 10^5$ to about $7.5 \times 10^5$, a molecular weight distribution of from about 5 to about 100 and a heat of fusion of 80 J/g or higher, percentages based on the weight of the first microporous membrane layer; and wherein said second layer comprises (a) from about 60 to about 90% of the first polyethylene, the first polyethylene of the second layer having a weight average molecular weight of from about $2.5 \times 10^5$ to about $5 \times 10^5$ and a molecular weight distribution of from about 5 to about 100, and (a') from about 10 to about 40% of a second polyethylene, the second polyethylene having a weight average molecular weight of from about $1 \times 10^6$ to about $5 \times 10^6$ and a molecular weight distribution of from about 5 to about 100, percentages based on the weight of the second microporous membrane layer; and wherein the total first to total second microporous membrane layer thickness ratio is in the range of from about 10/90 to about 75/25.

3. The multi-layer microporous membrane of embodiment 1 or 2 wherein said first microporous membrane layer comprises (a) from about 40 to about 60% of a first polyethylene having a weight average molecular weight of from about $2.5 \times 10^5$ to about $4 \times 10^5$ and a molecular weight distribution of from about 5 to about 50, (b) from about 25 to about 40% of a first polypropylene having a weight average molecular weight of from about $0.9 \times 10^6$ to about $1.4 \times 10^6$, a molecular weight distribution of from about 1 to about 50 and a heat of fusion of from about 80 to about 120 J/g, and (c) from about 10 to about 25% of a second polypropylene having a weight average molecular weight of from about $5 \times 10^5$ to about $7 \times 10^5$, a molecular weight distribution of from about 5 to about 50 and a heat of fusion of from about 80 to about 120 J/g, percentages based on the weight of the first microporous membrane layer; and said second microporous membrane layer comprises (a) from about 70 to about 85% of a first polyethylene having a weight average molecular weight of from about $2.5 \times 10^5$ to about $4 \times 10^5$ and a molecular weight distribution of from about 5 to about 50, and (a') from about 15 to about 30% of a second polyethylene having a weight average molecular weight of from about $1 \times 10^6$ to about $4 \times 10^6$ and a molecular weight distribution of from about 5 to about 50, percentages based on the weight of the second microporous membrane layer.

4. The multi-layer microporous membrane of embodiment 1-3 wherein (a) the first polyethylene is one or more of ethylene homopolymer or ethylene/α-olefin copolymer having a weight average molecular weight of from about $2.5 \times 10^5$ to about $5 \times 10^5$ and a molecular weight distribution of from about 5 to about 100, (b) the first polypropylene is one or more of propylene homopolymer or propylene/α-olefin copolymer having a weight average molecular weight of from about $0.8 \times 10^6$ to about $1.5 \times 10^6$ and a molecular weight distribution of from about 1 to about 100, and (c) the second polypropylene is one or more of propylene homopolymer or propylene/α-olefin copolymer having a weight average molecular weight of from about $4 \times 10^5$ to about $7.5 \times 10^5$ and a molecular weight distribution of from about 5 to about 100.

5. The multi-layer microporous membrane of embodiment 1-4 having a melt down temperature of 148° C. or higher and a thermal mechanical analysis maximum shrinkage in the molten state at 140° C. of 20% or less, and one or more properties of (1) an air permeability measured according to JIS P8117 ranging from about 20 to about 400 seconds/100 cm$^3$, (2) a porosity ranging from about 25 to about 80%, (3) a pin puncture strength of about 3500 mN or more at a membrane thickness of 20 μm, (4) a tensile strength of about 49,000 kPa or more, (5) a tensile elongation of 100% or more, (6) a heat shrinkage ratio of 12% or less, (7) a thickness variation ratio of 20% or less after heat compression, (8) an air permeability of 700 sec/100 cm$^3$ or less after heat compression, and (9) a surface roughness of $3 \times 10^2$ nm or more.

6. The multi-layer microporous membrane of embodiment 1-5 wherein the first microporous membrane layer and the second microporous membrane layer are in planar contact one with the other in the following order: first/second; first/second/first; first/second/first/second; or first/second/first/second/first.

7. The multi-layer microporous membrane of embodiment 1-6 wherein the second microporous membrane layer contains a greater amount of the first polyethylene than the first microporous membrane layer and the total amount of first polyethylene in the multi-layer microporous membrane is at least 37.5 wt. % based on the weight of the multi-layer microporous membrane.

8. A battery separator comprising a multi-layer microporous membrane which comprises at least one first microporous membrane layer and at least one second microporous membrane layer in planar contact one with the other, wherein said first microporous membrane layer comprises a first polyethylene, a first polypropylene, and a second polypropylene different from the first polypropylene; and wherein said second microporous membrane layer comprises a first polyethylene and a second polyethylene.

9. The battery separator of embodiment 9 wherein said first microporous membrane layer comprises (a) from about 30 to about 70% of a first polyethylene having a weight average molecular weight of from about $2.5 \times 10^5$ to about $5 \times 10^5$ and a molecular weight distribution of from about 5 to about 100, (b) from about 20 to about 40% of a first polypropylene having a weight average molecular weight of from about $0.8 \times 10^6$ to about $1.5 \times 10^6$, a molecular weight distribution of from about 1 to about 100 and a heat of fusion of 80 J/g or higher, and (c) from about 10 to about 30% of a second polypropylene having a weight average molecular weight of from about $4 \times 10^5$ to about $7.5 \times 10^5$, a molecular weight distribution of from about 5 to about 100 and a heat of fusion of 80 J/g or higher, percentages based on the weight of the first microporous membrane layer; and said second microporous membrane layer comprises (a) from about 60 to about 90% of a first polyethylene having a weight average molecular weight of from about $2.5 \times 10^5$ to about $5 \times 10^5$ and a molecular weight distribution of from about 5 to about 100, and (a') from about 10 to about 40% of a second polyethylene having a weight average molecular weight of from about $1 \times 10^6$ to about $5 \times 10^6$ and a molecular weight distribution of from about 5 to about 100, percentages based on the weight of the second microporous membrane layer; and wherein the total first to total second microporous membrane layer thickness ratio is from about 10/90 to about 75/25.

10. A battery comprising the battery separator of claim 9.

What is claimed is:

1. A multi-layer microporous membrane comprising:
   at least two first microporous membrane skin layers comprising;
   (a) from about 30 to about 70% of a first polyethylene,
   (b) from about 20 to about 40% of a first polypropylene, the first polypropylene having a weight average molecular weight of from about $0.8 \times 10^6$ to about $1.5 \times 10^6$, a molecular weight distribution of from about 1 to about 100 and a heat of fusion of 80 J/g or higher and
   (c) from about 10 to about 30% of a second polypropylene, the second polypropylene having a weight average molecular weight of from about $4 \times 10^5$ to about $7.5 \times 10^5$, a molecular weight distribution of from about 5 to about 100 and a heat of fusion of 80 J/g or higher, percentages based on the weight of the first microporous membrane skin layer; and
   at least one second microporous membrane layer in planar contact with the first microporous membrane comprising a high density polyethylene and an ultrahigh molecular weight polyethylene;
   wherein the first and second microporous membrane layers are formed into first layer/second layer/first layer or first layer/second layer/first layer/second layer/first layer structures.

2. The membrane of claim 1 wherein
   the first polyethylene has a weight average molecular weight of from about $2.5 \times 10^5$ to about $5 \times 10^5$ and a molecular weight distribution of from about 5 to about 100; and
   wherein said second layer comprises (a) from about 60 to about 90% of the high density polyethylene, the high density polyethylene of the second layer having a weight average molecular weight of from about $2.5 \times 10^5$ to about $5 \times 10^5$ and a molecular weight distribution of from about 5 to about 100, and (a') from about 10 to about 40% of the ultrahigh molecular weight polyethylene, the ultrahigh molecular weight polyethylene having a weight average molecular weight of from about $1 \times 10^6$ to about $5 \times 10^6$ and a molecular weight distribution of from about 5 to about 100, percentages based on the weight of the second microporous membrane layer; and
   wherein the total first to total second microporous membrane layer thickness ratio is in the range of from about 10/90 to about 75/25.

3. The multi-layer microporous membrane of claim 2 wherein said first microporous membrane skin layer comprises (a) from about 40 to about 60% of the first polyethylene, the first polyethylene having a weight average molecular weight of from about $2.5 \times 10^5$ to about $4 \times 10^5$ and a molecular weight distribution of from about 5 to about 50, (b) from about 25 to about 40% of the first polypropylene, the first polypropylene having a weight average molecular weight of from about $0.9 \times 10^6$ to about $1.4 \times 10^6$, a molecular weight distribution of from about 1 to about 50 and a heat of fusion of from about 80 to about 120 J/g, and (c) from about 10 to about 25% of the second polypropylene, the second polypropylene having a weight average molecular weight of from about $5 \times 10^5$ to about $7 \times 10^5$, a molecular weight distribution of from about 5 to about 50 and a heat of fusion of from about 80 to about 120 J/g, percentages based on the weight of the first microporous membrane skin layer; and said second microporous membrane layer comprises (a) from about 70 to about 85% of the high density polyethylene, the high density polyethylene having a weight average molecular weight of from about $2.5 \times 10^5$ to about $4 \times 10^5$ and a molecular weight distribution of from about 5 to about 50, and (a') from about 15 to about 30% of the ultrahigh molecular weight polyethylene, the ultrahigh molecular weight polyethylene having a weight average molecular weight of from about $1 \times 10^6$ to about $4 \times 10^6$ and a molecular weight distribution of from about 5 to about 50, percentages based on the weight of the second microporous membrane layer.

4. The multi-layer microporous membrane of claim 1 wherein (a) the first polyethylene is one or more of ethylene homopolymer or ethylene/α-olefin copolymer having a weight average molecular weight of from about $2.5 \times 10^5$ to about $5 \times 10^5$ and a molecular weight distribution of from about 5 to about 100, (b) the first polypropylene is one or more of propylene homopolymer or propylene/α-olefin copolymer; and (c) the second polypropylene is one or more of propylene homopolymer or propylene/α-olefin copolymer.

5. The multi-layer microporous membrane of claim 1 having a melt down temperature of 148° C. or higher and a thermal mechanical analysis maximum shrinkage in the molten state at 140° C. of 20% or less, and one or more properties of (1) an air permeability measured according to JIS P8117 ranging from about 20 to about 400 seconds/100 cm$^3$, (2) a porosity ranging from about 25 to about 80%, (3) a pin puncture strength of about 3500 mN or more at a membrane thickness of 20 µm, (4) a tensile strength of about 49,000 kPa or more, (5) a tensile elongation of 100% or more, (6) a heat shrinkage ratio of 12% or less, (7) a thickness variation ratio of 20% or less after heat compression, (8) an air permeability of 700 sec/100 cm$^3$ or less after heat compression, and (9) a surface roughness of $3 \times 10^2$ nm or more.

6. The multi-layer microporous membrane of claim 1 wherein the second microporous membrane layer contains a greater amount of the first polyethylene than the first microporous membrane skin layer and the total amount of first polyethylene in the multilayer microporous membrane is at least 37.5 wt. % based on the weight of the multi-layer microporous membrane.

* * * * *